(12) United States Patent  
Nishibayashi et al.

(10) Patent No.: US 8,255,900 B2  
(45) Date of Patent: Aug. 28, 2012

(54) VIRTUAL COMPUTER SERVER APPARATUS, AND UPDATE IMAGE DETECTION METHOD

(75) Inventors: Yasuyuki Nishibayashi, Kawasaki (JP); Masataka Goto, Yokohama (JP); Mika Minematsu, Kawasaki (JP); Shinya Murai, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 851 days.

(21) Appl. No.: 12/365,576

(22) Filed: Feb. 4, 2009

(65) Prior Publication Data

US 2009/0204957 A1 Aug. 13, 2009

(30) Foreign Application Priority Data

Feb. 7, 2008 (JP) ................................ 2008-027836

(51) Int. Cl.  
*G06F 9/44* (2006.01)
(52) U.S. Cl. ........ 717/172; 717/168; 717/169; 717/170; 717/171
(58) Field of Classification Search .................. None  
See application file for complete search history.

(56) References Cited

U.S. PATENT DOCUMENTS

| | | | | |
|---|---|---|---|---|
| 5,765,206 A * | 6/1998 | Hohensee et al. | ............ | 711/203 |
| 6,263,403 B1 * | 7/2001 | Traynor | ........................ | 711/133 |
| 6,784,855 B2 | 8/2004 | Matthews et al. | ............... | 345/1.1 |
| 7,395,278 B2 * | 7/2008 | Zwilling et al. | ........................ | 1/1 |
| 7,613,945 B2 * | 11/2009 | Soran et al. | ................... | 714/5.11 |
| 7,747,838 B2 * | 6/2010 | Hepkin et al. | ................. | 711/209 |
| 7,783,858 B2 * | 8/2010 | Chiang et al. | ................. | 711/207 |
| 2009/0016566 A1 | 1/2009 | Goto et al. | .................... | 382/100 |

FOREIGN PATENT DOCUMENTS

| | | |
|---|---|---|
| JP | 11-272591 | 10/1999 |
| JP | 2007-265208 | 10/2007 |

OTHER PUBLICATIONS

Official Action dated Mar. 1, 2011 from corresponding Japanese Patent Application No. 2008-027836.

* cited by examiner

*Primary Examiner* — Isaac Tecklu  
*Assistant Examiner* — Mohammad Kabir  
(74) *Attorney, Agent, or Firm* — Ohlandt, Greeley, Ruggiero & Perle, L.L.P.

(57) ABSTRACT

A virtual computer server apparatus includes an image information memory to store image information upon dividing into pages, the page being a memory of a predetermined size, an update unit configured to update the image information stored in the image information memory in accordance with operation of the application program, an update page detection unit configured to detect an update page from the pages storing image information transmitted to the terminal and displayed by the terminal as a display area, an update image detection unit configured to detect the image information updated by the update unit from image information in the update page before updated and image information in the update page after updated.

26 Claims, 16 Drawing Sheets

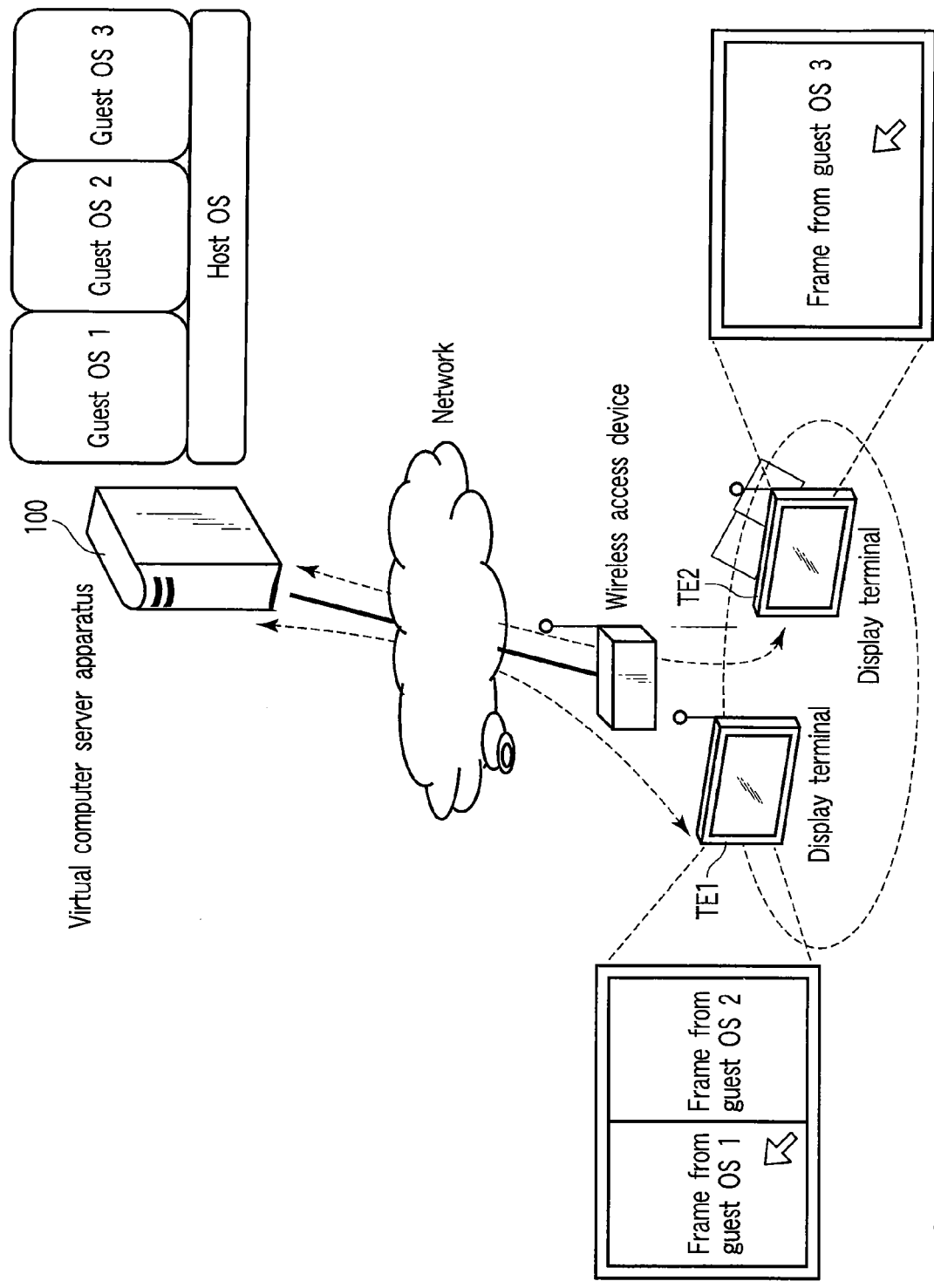
F I G. 1

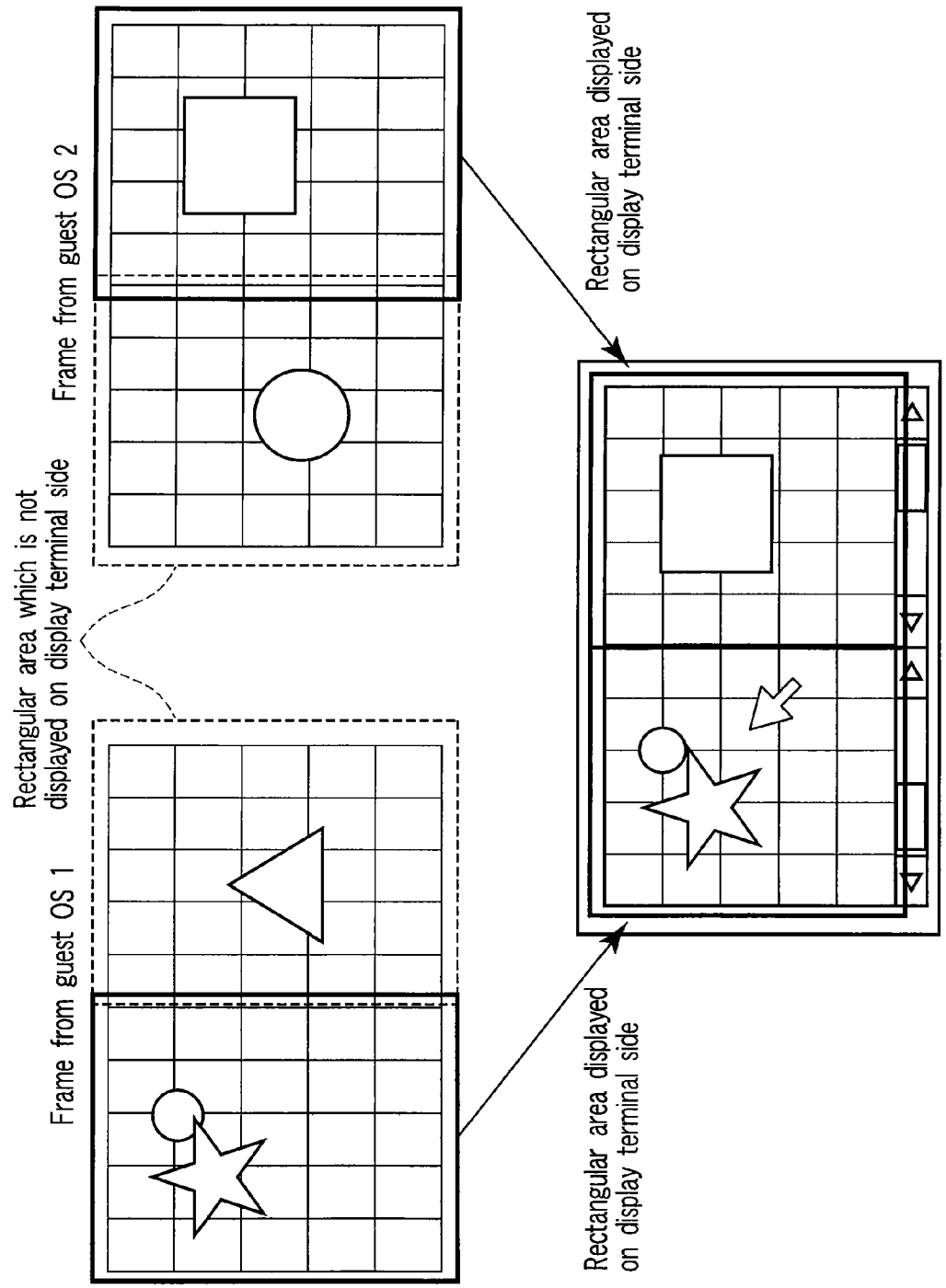
F I G. 2

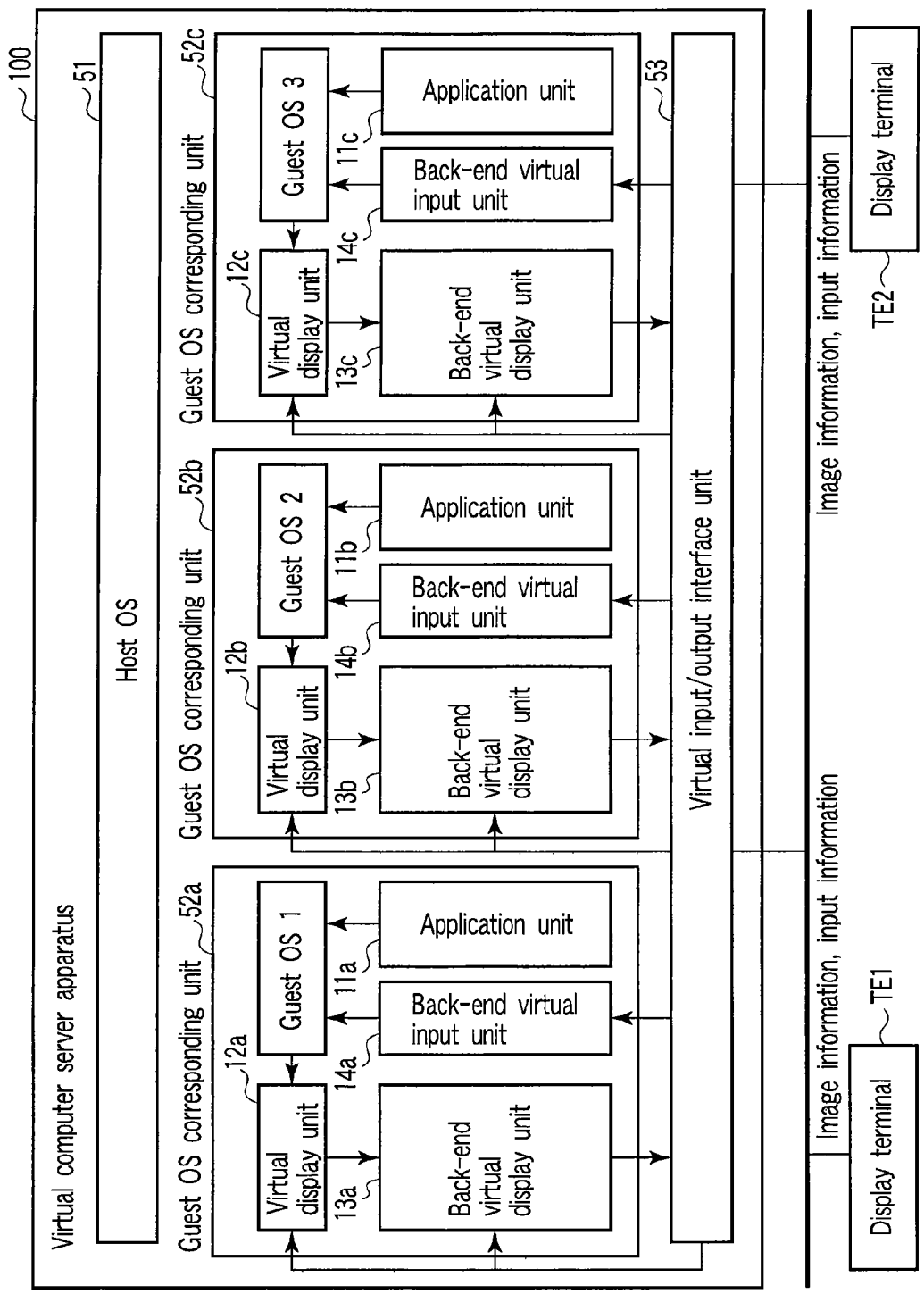
F I G. 4

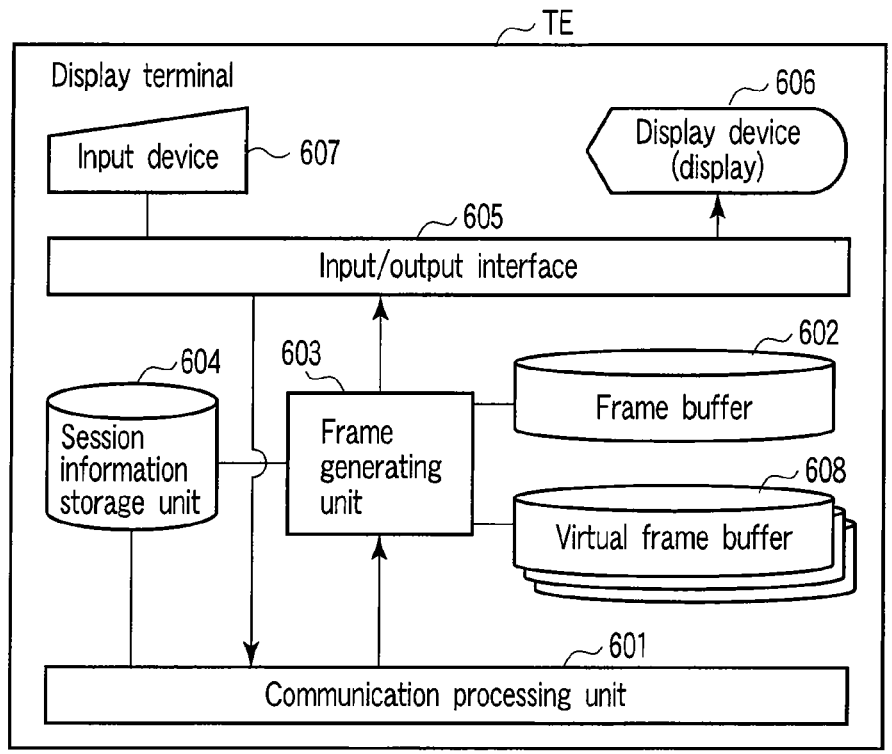
F I G. 14
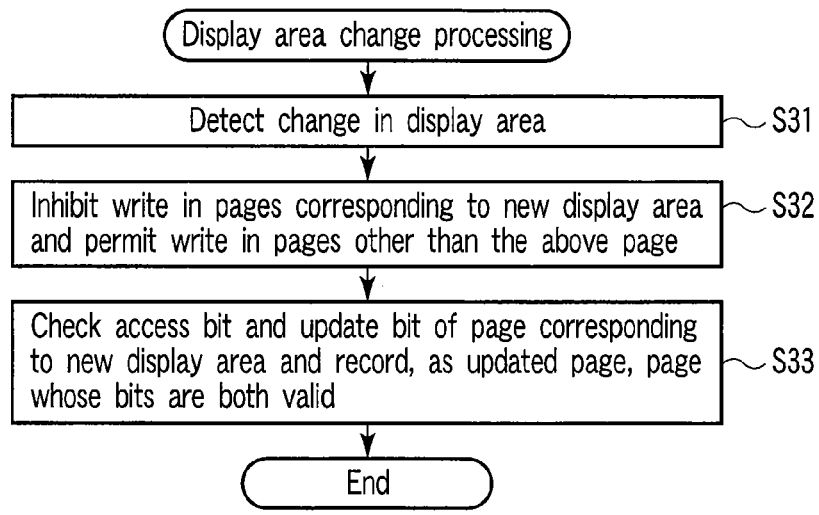
F I G. 15

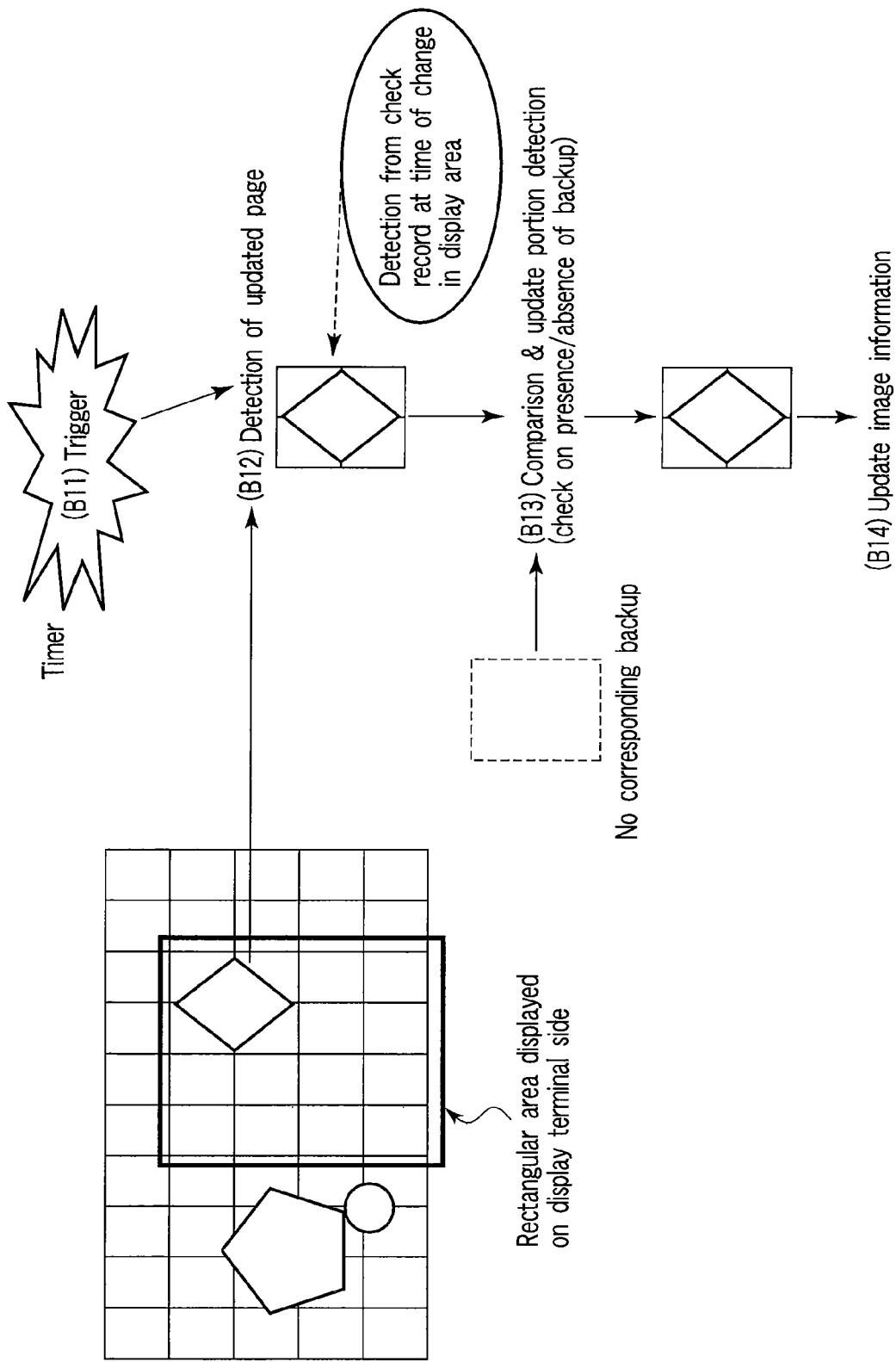
F I G. 17

VIRTUAL COMPUTER SERVER APPARATUS, AND UPDATE IMAGE DETECTION METHOD

CROSS-REFERENCE TO RELATED APPLICATIONS

This application is based upon and claims the benefit of priority from prior Japanese Patent Application No. 2008-027836, filed Feb. 7, 2008, the entire contents of which are incorporated herein by reference.

BACKGROUND OF THE INVENTION

1. Field of the Invention

The present invention relates to a virtual computer server apparatus which transmits an update image for updating an image displayed by a terminal device connected via a network.

2. Description of the Related Art

In order to improve usability, in some computer systems, a terminal device having a minimal input/output interface is provided on the user side, and complicated arithmetic processing is executed on a main body apparatus placed in a remote place.

One such system which has already been proposed projects, for example, frame information (image information) from a main body apparatus (e.g., a personal computer or server computer) onto a remote display terminal via a network (see, for example, the specification in U.S. Pat. No. 6,784,855).

In this system, input information (pen-input information or the like with a digitizer) from the display terminal is also transmitted to the main body apparatus via the network, and the main body apparatus executes actual application program processing. Subsequently, the execution result and frame update information are transferred to the display terminal via the network. The terminal device executes rendering operation based on the received frame update information.

In addition, VNC (Virtual Network Computing) is known as a technique for efficiently transmitting frame information from a main body apparatus on a remote network to a terminal device. According to VNC, when update of a frame is detected, the value of current pixel information is compared with the value of pixel information previously transmitted to a display terminal to determine an update frame which has changed from the previous frame. Furthermore, after the updated display area is subjected to still image compression, only the difference information between compressed frames is transmitted to the display terminal. This can reduce communication bandwidth and processing overhead consumption.

Another virtual computer technique virtualizes resources such as the CPU (Central Processing Unit) and storage device of a computer and executes the virtualized computer. This technique allows a plurality of guest OSs (Operating Systems) to simultaneously operate on one physical computer. Note that a case without any change in guest OSs is called full-virtualization, and a case of partly modifying guest OSs is called para-virtualization. An OS which manages a plurality of guest OSs is called a host OS.

Consider a system which displays, on a terminal device, a screen image from an application or the like operating on a virtual computer server apparatus. In this case, it is necessary to efficiently acquire image information from a frame buffer and transfer the information to an external apparatus. Assume that the content to be actually displayed on the terminal device side is limited to a partial area of the entire screen image managed by a guest operating system. If the means described in the prior art is simply applied to this case, it is necessary to perform update detection processing for the entire screen image. In this case, update of a non-display area on the terminal device is unnecessarily detected, resulting in a deterioration in the processing efficiency of the virtual computer server apparatus.

As described above, according to the prior art, if the frame area to be displayed on a terminal device connected via a network is limited to a part of the screen image on the virtual computer server apparatus which transmits image information, it is necessary to detect an update portion in a non-display area which is not displayed on the terminal device in addition to the display area displayed on the terminal device, resulting in a deterioration in the processing efficiency of the virtual computer server apparatus.

BRIEF SUMMARY OF THE INVENTION

According to embodiments of the present invention, there is provided a virtual computer server apparatus which transmits image information generated by operating an application program to a terminal via a network.

The apparatus includes:

an image information memory (202) to store the image information upon dividing into pages, the page being a memory of a predetermined size;

an update unit (111) configured to update the image information stored in the image information memory in accordance with operation of the application program;

an update page detection unit (303) configured to detect an update page from the page storing image information transmitted to the terminal and displayed by the terminal as a display area;

an update image detection unit (303) configured to detect the image information updated by the update unit from image information in the update page before updated and image information in the update page after updated;

a transmission image generating unit (53) configured to generate transmission image information from the image information updated detected by the update image detection unit; and a transmission unit (53) configured to transmit the transmission image information to the terminal.

According to the embodiments, when image information including both a display area to be displayed on a terminal and a non-display area not to be displayed on the terminal is updated, it is possible to efficiently detect an update image for updating the image information to be displayed on the terminal.

BRIEF DESCRIPTION OF THE SEVERAL VIEWS OF THE DRAWING

FIG. 1 is a view showing an example of the overall arrangement of a system;

FIG. 2 is a view showing the relationship between images from guest OSs 1 and 2 and a screen image on a display terminal TE1 in FIG. 1;

FIG. 4 is a block diagram showing an example of the arrangement of a virtual computer server apparatus;

FIG. 14 is a block diagram showing an example of the arrangement of a display terminal according to the second embodiment;

FIG. 15 is a flowchart for explaining display area change processing according to the second embodiment;

FIG. 17 is a view for explaining update image detection processing according to the second embodiment;

DETAILED DESCRIPTION OF THE INVENTION

[First Embodiment]

Referring to FIG. 1, in a virtual computer server apparatus 100, a plurality of guest OSs (Operating Systems) concurrently run on a host OS. The respective guest OSs execute application programs which provide various kinds of processing, and individually generate screen images. The virtual computer server apparatus 100 has a communication interface. The virtual computer server apparatus 100 generates image information for the display of an image, and then transmits the information to a display terminal connected via a network.

Display terminals TE1 and TE2 each have a communication interface similar to that of the virtual computer server apparatus 100. Upon receiving the image information transmitted by the virtual computer server apparatus 100 via the network, each display terminal generates a frame to be displayed, and then executes output (render) processing. The display terminal TE1 in FIG. 1 simultaneously displays frames from guest OSs 1 and 2 of the virtual computer server apparatus 100. The display terminal TE2 displays a frame from guest OS 3.

When a user performs an input operation on a display terminal, the input information is delivered to the virtual computer server apparatus 100 via the network, and is distributed as an input to a corresponding guest OS. Thereafter, application processing is executed. If an image from the guest OS is to be updated as a result of the execution of the application processing, the virtual computer server apparatus 100 transmits the image information of the update portion to the display terminal.

As shown in FIG. 2, guest OSs 1 and 2 in FIG. 1 have independent frame buffers which do not interface each other, and each execute render processing based on the application processing result. In the case shown in FIG. 2, if, for example, image areas from guest OSs 1 and 2 each have the XGA (eXtended Graphic Array: 1024×768 pixels) size, and the output resolution of the display terminal TE1 also corresponds to the XGA size, it is impossible to simultaneously display the entire image areas from the two guest OSs. As a consequence, guest OSs 1 and 2 each generate a rectangular area to be displayed on the display terminal TE1 and a rectangular area not to be displayed on the terminal.

Figure 3:
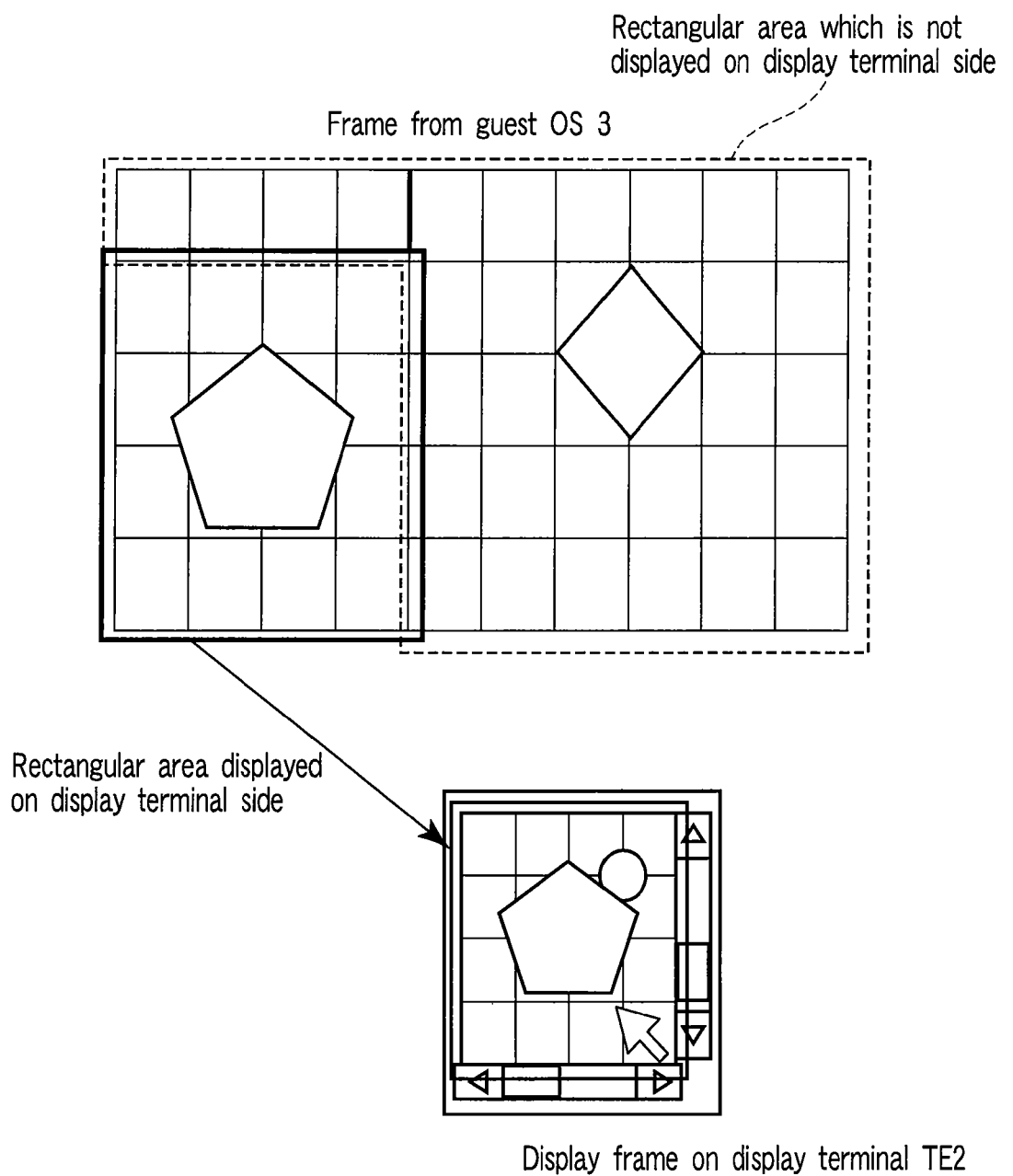
FIG. 3 is a view showing the relationship between a screen image from guest OS 3 and a displayed image on a display terminal TE2 in FIG. 1.

As shown in FIG. 3, if the image area from guest OS 3 in FIG. 1 has the UXGA (Ultra extended Graphic Array: 1600×1200 pixels) size, and the output resolution of the display terminal TE2 corresponds to the VGA (Video Graphic Array: 640×480 pixels) size, the entire image from guest OS 3 cannot be displayed as in the case shown in FIG. 2. In this case as well, a rectangular area to be displayed on the display terminal TE2 and a rectangular area not to be displayed on the terminal are generated. In this case, a scroll bar can be displayed on the display terminal via the network by generating image information on the virtual computer server apparatus side.

In general, detecting an update portion (update image) of the image information stored in a frame buffer involves methods such as detecting an update portion by comparing the pixel information of a image area displayed in the past with pixel information of the latest image area at a constant period, and a method of detecting an update portion by causing software which writes in the frame buffer to report the coordinate information (rectangle information) of the update portion. In the former method, the processing load accompanying the comparison between the pieces of pixel information of an entire screen image area is high. In the latter method, it is necessary to change the software sequence so as to report the coordinate information of an update portion.

In a virtual computer environment, in order to make an application on a guest OS report information accompanying render processing to the host OS side, it is necessary to modify the operating system. In addition, the overhead for reporting increases. In addition to these problems, as in the case shown in FIGS. 1, 2, and 3, when there are areas which are displayed and not displayed on a terminal device (display terminal TE1 or TE2) connected via the network, update detection processing for the non-display rectangular area increases the amount of unnecessary processing for the virtual computer server apparatus 100.

The virtual computer server apparatus of the present invention can efficiently process an update image by transmitting a display image upon detecting an update portion for each page corresponding to an area displayed on a terminal device.

As shown in FIG. 4, the virtual computer server apparatus 100 is connected to the terminal devices (to be referred to as display terminals hereinafter) TE1 and TE2, which the user operates, via the network. The display terminals TE1 and TE2 each have a function of displaying, on the display terminals thereof, the image information transferred from the virtual computer server apparatus 100 on the display unit. The display terminals TE1 and TE2 each also have a function of receiving the image information of an update portion of the image transferred from the virtual computer server apparatus 100, i.e., an update image, and updating the display frame by using the received update image.

The virtual computer server apparatus 100 in FIG. 4 includes a host OS 51 functioning as a base which causes the apparatus to operate, a plurality of guest OS corresponding units 52a to 52c respectively corresponding to a plurality of guest OSs (three guest OSs 1, 2, and 3 in this case), and a virtual input/output interface unit 53.

The guest OS corresponding units 52, i.e., 52a, 52b, and 52c, respectively include corresponding OSs 1, 2, and 3, application units 11, i.e., 11a, 11b, and 11c, virtual display units 12, i.e., 12a, 12b, and 12c, back-end virtual display units 13, i.e., 13a, 13b, and 13c, and back-end virtual input units 14, i.e., 14a, 14b, and 14c.

The guest OS corresponding unit 52a corresponding to guest OS 1 includes guest OS 1, the application unit 11a, the virtual display unit 12a, the back-end virtual display unit 13a, and the back-end virtual input unit 14a.

The guest OS corresponding unit 52b corresponding to guest OS 2 includes guest OS 2, the application unit 11b, the virtual display unit 12b, the back-end virtual display unit 13b, and the back-end virtual input unit 14b.

The guest OS corresponding unit 52c corresponding to guest OS 3 includes guest OS 3, the application unit 11c, the virtual display unit 12c, the back-end virtual display unit 13c, and the back-end virtual input unit 14c.

Guest OSs 1, 2, and 3 are OSs which cause the virtual computer environment to operate, and run on the host OS 51. The application units 11a, 11b, and 11c respectively execute programs which provide various kinds of processing and operate on guest OSs 1, 2, and 3, respectively.

The virtual display units 12a, 12b, and 12c are virtual display devices for outputting image information generated by guest OSs 1, 2, and 3, and include frame buffers storing image information. These units operate on the host OS.

The back-end virtual display units 13a, 13b, and 13c execute common processing associated with image display, and operate on the host OS 51. The back-end virtual input units 14a, 14b, and 14c notify guest OSs 1, 2, and 3 of pieces of information input by mouse operation and keyboard operation upon converting the pieces of information into forms suitable for the respective guest OSs, and operate on the host OS 51 like the back-end virtual display units.

The virtual input/output interface unit 53 performs transmission/reception processing for image information and input information, and manages image areas to be displayed on the display terminals TE1 and TE2. The virtual input/output interface unit 53 operates on the host OS 51.

Note that FIG. 4 shows a case in which the three guest OSs are running on the virtual computer server apparatus 100. The numbers of application units, virtual display units, back-end virtual display units, and back-end virtual input units each are equal to the number of guest OSs.

Figure 5:
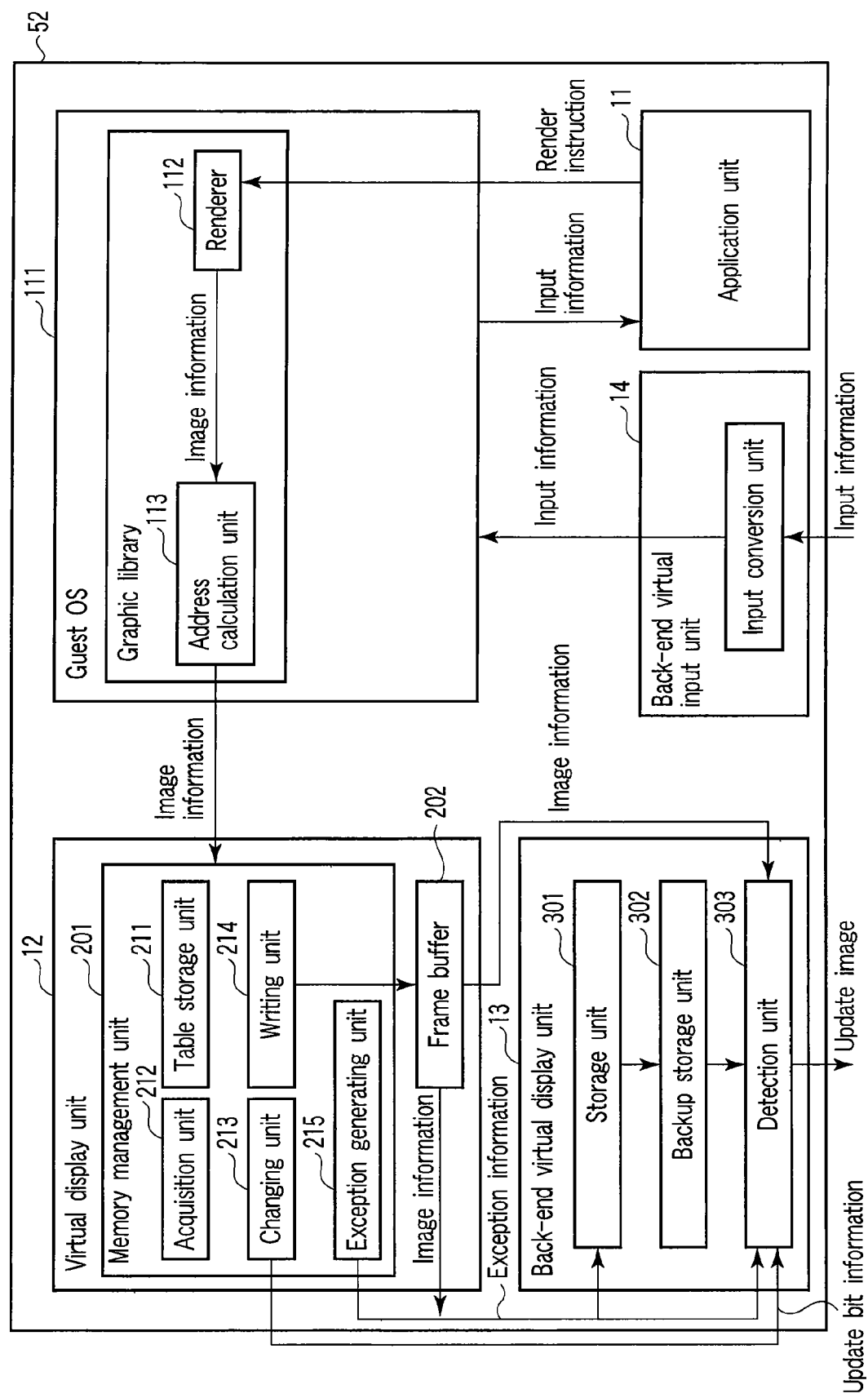
FIG. 5 is a block diagram showing an example of the arrangement of each guest OS corresponding unit of the virtual computer server apparatus.

As shown in FIG. 5, each guest OS includes a graphic library 111 as a function associated with image display. In addition to this function associated with image display, each guest OS includes all functions necessary for the operation of the virtual computer environment. The graphic library 111 comprises a renderer 112 and an address calculation unit 113.

The renderer 112 performs various kinds of image processing in accordance with a render instruction designated by an application or the like, and outputs image information as a result of the processing. For example, upon receiving a render instruction to enlarge/reduce a given area, the renderer 112 specifies an area to be enlarged/reduced from the coordinate information contained in the render instruction, and outputs image information containing the coordinate information of the area which is the result of enlargement/reduction processing for the area. Note that in the case of an image with 1024×768 pixels, for example, coordinate information represents information expressed by a coordinate system with the upper left and lower right of its image being defined as (0, 0) and (1023, 767), respectively. Assume that in the first embodiment, the coordinate information (rectangle information) of a pixel on a frame is represented by X-Y coordinates with the rightward direction of the image being the X-coordinate direction and the downward direction of the image being the Y-coordinate direction.

The an address calculation unit 113 receives the image information output from the renderer 112, and converts the coordinate information of the image information into a memory address in the frame buffer.

The virtual display unit 12 comprises a memory management unit 201 and a frame buffer 202. The memory management unit 201 manages access to the frame buffer 202 by a virtual memory scheme, and comprises a table storage unit 211, an acquisition unit 212, a changing unit 213, a writing unit 214, and an exception generating unit 215.

The table storage unit 211 stores a conversion table for converting virtual addresses into physical addresses.

The details of the structure of the conversion table and an address conversion sequence by the memory management unit 201 using the conversion table will be described below.

According to the virtual memory scheme, software accesses a logically linear memory space in a virtual address space by using a virtual address. A 32-bit virtual address will be described as an example. A 32-bit virtual address is divided into 10-bit, 10-bit, and 12-bit parts. The upper 10 bits of the virtual address are used to specify an entry in a page directory which is an upper table of the conversion table expressed by a two-stage hierarchical structure. The specified entry includes pointer information for specifying one of a plurality of page tables as lower tables. The middle 10 bits of the virtual address are used to specify an entry in the page table specified by this pointer. The specified entry includes a pointer for specifying a page block (to be referred to as a page hereinafter) in the physical address apace. Note that a page is a basic unit in the management of the memory space of the computer with the memory space being divided into portions each having a predetermined size. In this embodiment as well, a memory as a basic unit with a physical memory size that can be mapped at a virtual address is called a page, and continuous physical memories are assigned to pages. The lower 12 bits of a virtual address represent an offset in the page specified by this pointer. In this manner, the 32-bit virtual address can be converted into a physical address.

An entry in a page directory includes a pointer to a page table, a validity bit (Enable bit) indicating the validity/invalidity of the entry in the page table, a write bit (Writable bit) indicating permission/prohibition of a data write in a page in the page table, an update bit (Dirty bit) which is set to "1" when a data write (update) is performed in the page, and an access bit (Access bit) which is set to "1" when the entry is referred to in the process of conversion from a virtual address to a physical address. The names of bits sometimes differ from those described above, depending on the type of processor or whether positive or negative logic is used. In general, however, there is an entry including the above information.

A page table is a structure (table) which manages the correspondence between the physical memory in each page and the logical memory space, and also manages information such as a write bit and an update bit.

A write bit is information which is managed together with a page in a page table to identify whether writing an information on the page is prohibited or not.

An update bit is information which is managed together with a page in a page table to identify whether the updated page exists or not.

Referring to FIG. 5, an acquisition unit 212 acquires a physical address corresponding to the virtual address of image information, for which a write request in the frame buffer 202 is generated, by using the conversion table having the above arrangement.

The changing unit 213 changes the information of each entry in the conversion table in accordance with an access request for the frame buffer 202. For example, the changing unit 213 changes to "1" the access bit and the update bit in a page table which correspond to a page containing the virtual address of image information for which a write (update) request is generated.

The writing unit 214 writes the image information, for which the write request is generated, at the physical address in the frame buffer 202 which is acquired by the acquisition unit 212.

The exception generating unit 215 generates a page exception for a page for which a write request is generated. More specifically, the exception generating unit 215 generates a page exception (a kind of interrupt) when a write request is generated for a page for which the write bit is disabled (the value of "0"). Note that write bits may be set in all the page tables associated with a display area, and negative logic may be used instead of positive logic. This makes it possible to always generate a page exception when a write request is generated for a page belonging to a display area. (the page belonging to the display area is called a displayed page).

A page exception is an interrupt which is generated when information is written in a page for which a write is inhibited by a write bit.

The exception generating unit 215 generates another exception handled by a general virtual memory scheme. Assume that an access to a virtual address space is requested, and the acquisition unit 212 searches the conversion table. In this case, when the validity bit of the entry in the searched-out page directory or the entry of the page table is invalid (the value of "0"), the exception generating unit 215 generates a page exception for a processor. Note that when a page exception is generated, the processor can detect a specific virtual address to which an access has been made. In addition, at the time of generation of a page exception, the processor performs processing, e.g., mapping of a page, as needed. The processor mode also recovers from an exception by updating the conversion table as needed.

The frame buffer 202 is a storage unit on the host OS side, which is used to store full screen image information managed by a guest OS. If, for example, one rectangle image comprising 1024×768 pixels and color information comprising four bytes per pixel (red information comprising one byte, green information comprising one byte, blue information comprising one byte, and transmission information comprising one byte) are to be used, a memory area corresponding to 1024×768×4 bytes is ensured. The image information generated by a guest OS is stored in the frame buffer 202 on a page basis in accordance with the physical address acquired by the acquisition unit 212.

The back-end virtual display unit 13 includes a storage unit 301, a backup storage unit 302, and a detection unit 303.

The backup storage unit 302 is a storage unit which can store the backup data of the image information of each page which is updated. When the exception generating unit 215 generates a page exception upon generation of a write request for a page for which the write bit is disabled, the storage unit 301 stores, in the backup storage unit 302, the image information of the page for which the page exception has been generated.

The detection unit 303 detects an update portion (update image) of image information for each page managed by the memory management unit 201. More specifically, upon receiving the page exception generated by the exception generating unit 215, the detection unit 303 detects the page for which the page exception has been generated as an update page in which the image information has been updated, and records it. The detection unit 303 compares the image information before update, which is stored in the backup storage unit 302 with the latest image information after the update which is written in the frame buffer 202 by the writing unit 214 for each updated page, and detects a rectangle containing a different portion as an update image.

Figure 6:
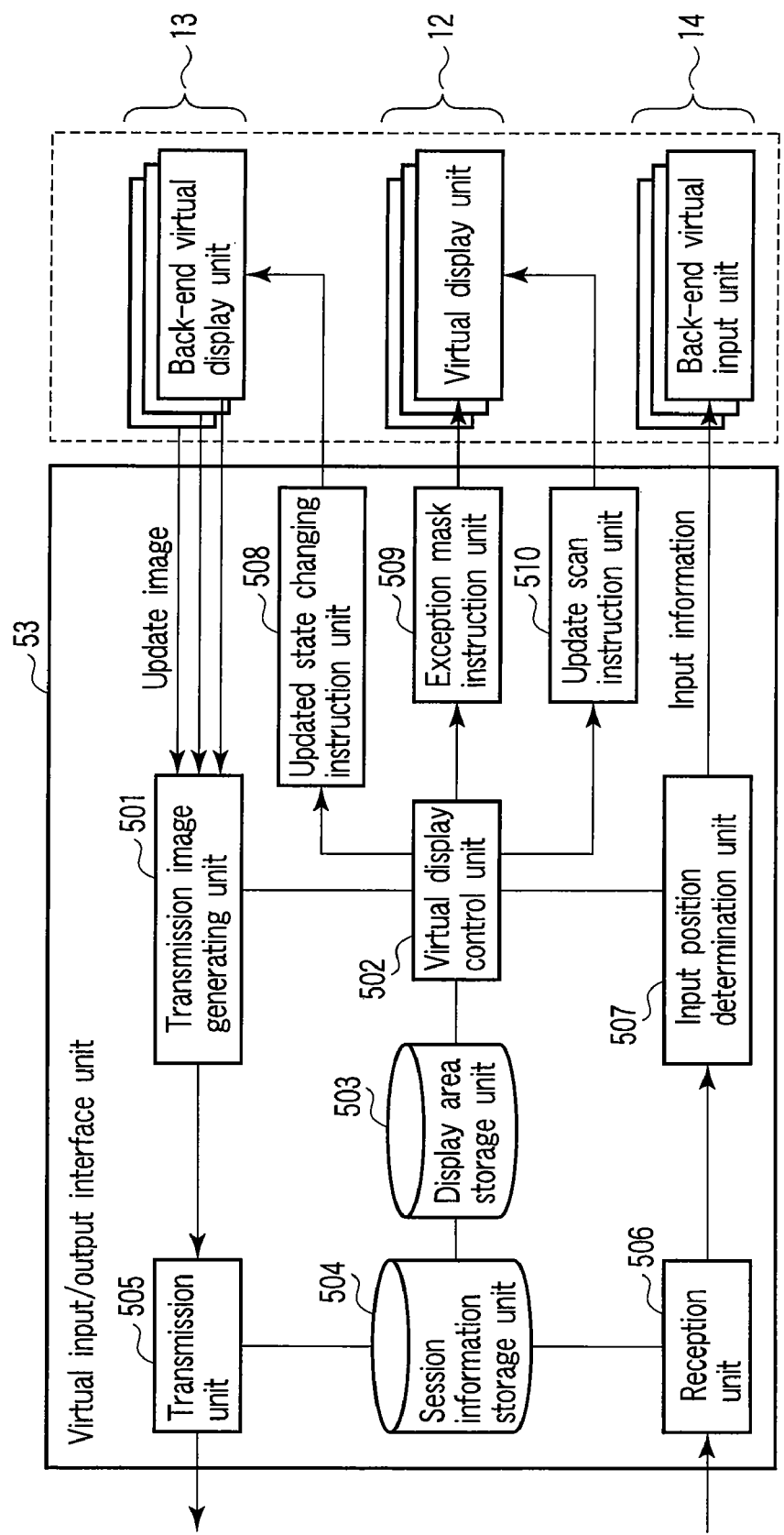
FIG. 6 is a block diagram showing an example of the arrangement of a virtual input/output interface unit of the virtual computer server apparatus.

As shown in FIG. 6, the virtual input/output interface unit 53 manages the display areas on the display terminals TE1 and TE2. The virtual input/output interface unit 53 then generates and transmits transmission image information on the basis of the update image information acquired by the detection unit 303.

The virtual input/output interface unit 53 includes a transmission image generating unit 501, a virtual display control unit 502, a display area storage unit 503, a session information storage unit 504, a transmission unit 505, a reception unit 506, and an input position determination unit 507.

The transmission image generating unit 501 acquires a display image which can be displayed on a display terminal by using the image information of the update portion detected by the detection unit 303 in the back-end virtual display unit 13 of each guest OS corresponding unit 52, and also generates a transmission image. A transmission image is an image having undergone image compression processing in consideration of the band of a communication path. As image compression processing, JPEG (Joint Photographic Experts Group), which is lossy compression, or a lossless compression can be used.

The transmission image generating unit 501 processes only the display area to be actually displayed on a display terminal as an update image with respect to an image area on the guest OS on the basis of information from the virtual display control unit 502, and generates a display image such as a scroll bar, as needed.

The transmission unit 505 transmits the image information (compressed image information) generated by the transmission image generating unit 501 to the display terminal on the basis of the information in the session information storage unit 504.

The session information storage unit 504 stores the IP (Internal Protocol) address information of the virtual computer server apparatus 100 and each display terminal connected via the network, port number information, user (terminal device) identification information, and the like.

The display area storage unit 503 stores information (display area information) indicating the range (rectangle) of a display area corresponding to terminal device identification information. That is, in the case of the display terminal TE1 in FIG. 1, when guest OSs 1 and 2 each have an image area comprising 1024×768 pixels, and a display terminal having a resolution of 1024×768 pixels simultaneously displays images from the two guest OSs, the display area from guest OS 1 is recorded as display area information from guest OS 1 with the upper left portion and lower right portion of its display area being defined as (0, 0) and (511, 767), respectively. Likewise, the display area from guest OS 2 is recorded as display area information from guest OS 2 with the upper left portion and lower right portion of its display area being defined as (512, 0) and (1023, 767), respectively. The information of a rectangle indicating the range of a display area can be recorded in the form of (X-coordinate of start point, Y-coordinate of start point, width, length) like (0, 0, 512, 768). (Subsequently, the description method represented by (X-coordinate of start point, Y-coordinate of start point, width, length) will be used for rectangle information).

Upon detecting a change in the display area on the display terminal, the virtual display control unit 502 updates the information in the display area storage unit 503, and executes processing necessary for efficient detection of frame update according to the first embodiment via an updated state changing instruction unit 508 and an exception mask instruction unit 509.

The updated state changing instruction unit 508 has a function of deleting image (page) information stored in the backup storage unit 302 of the back-end virtual display unit 13. The updated state changing instruction unit 508 causes the detection unit 303 of the back-end virtual display unit 13 to delete the update detection history of a page which has changed from a display area to a non-display area and record an entire new display area as an update target.

The exception mask instruction unit 509 performs setting control on the exception generating unit 215 in the virtual display unit 12 so as to enable the write bit of each page which has become a non-display area on the display terminal side and disable the write bit of each page belonging to a new display area. That is, when the guest OS executes render processing for an area to be actually displayed on the display terminal, the exception generating unit 215 generates a page exception. On the other hand, even if render information is written in an area (non-display area) which is not displayed on the display terminal, the exception generating unit 215 do not generate any page exception even though the frame buffer 202 is updated.

The reception unit 506 in FIG. 6 receives input information such as a mouse input or keyboard input via the network.

The input position determination unit 507 determines one of the back-end virtual display units 13a to 13c to which the input information is to be notified, on the basis of information associated with the display area from the guest OS which is acquired via the virtual display control unit 502 and input coordinate position information. For example, in the case shown in FIG. 1, if a display area from guest OS 1 is defined by (0, 0, 512, 768) and input coordinate positions (X-coordinate, Y-coordinate) are (50, 50), the input position determination unit 507 notifies the back-end virtual display unit 13a associated with guest OS 1 of the received input information. If the input position determination unit 507 detects an input for designating movement or the like of the scroll bar generated by the virtual input/output interface unit 53, the input position determination unit 507 notifies the virtual display control unit 502 of the occurrence of a change in the display area.

Figure 7:
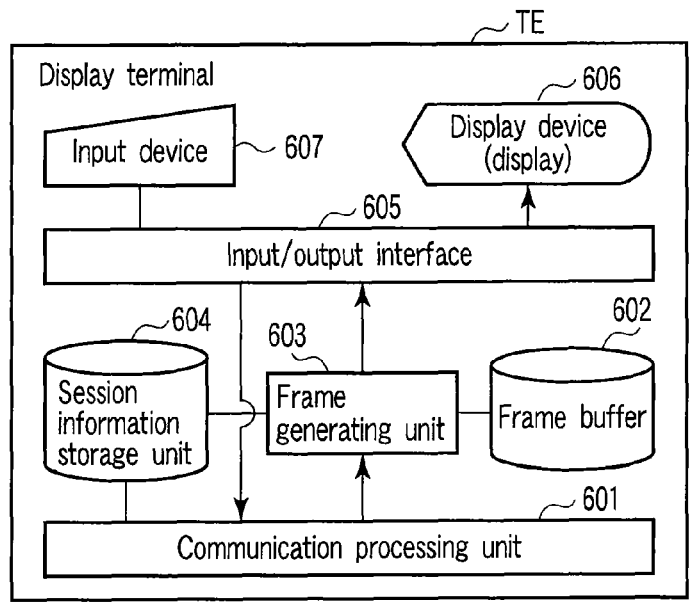
FIG. 7 is a block diagram showing an example of the arrangement of a display terminal according to the first embodiment.

FIG. 7 shows an example of the arrangement of each of the display terminals (terminal devices) TE1 and TE2 (to be collectively referred to as a display terminal TE hereinafter). The display terminal TE includes a communication processing unit 601, a frame buffer 602 which stores image information, a frame generating unit 603, a session information storage unit 604, an input/output interface 605, a display 606, and an input device 607.

Upon receiving the updated image packet received from the virtual computer server apparatus 100, the communication processing unit 601 transfers the compressed image data extracted from the packet to the image generating unit 603.

After decompressing the received compressed image data, the image generating unit 603 renders the decompressed image data at a designated position in the frame buffer 602. That is, the image generating unit 603 displays, at a designated position on the display 606, the partial image generated by decompressing the compressed image transmitted from the virtual computer server apparatus 100 and received by the communication processing unit 601. In addition, the input information to the input device 607 is transmitted to the virtual computer server apparatus 100 connected via the network.

Assume that in the first embodiment, the frame buffer 602 which the display terminal TE includes has the same resolution as the maximum output resolution of the display device (display) 606 can output. That is, if the output resolution of the display device 606 of the display terminal TE is 1024×768 pixels and color information comprises four bytes per pixel, a memory area corresponding to 1024×768×4 bytes is ensured. The image information rendered in the frame buffer 602 is output to the display device 606 via the input/output interface 605 at a constant period by using a timer in accordance with an instruction from the frame generating unit 603.

Image write processing, display area change processing, and update portion detection processing according to the first embodiment will be described next with reference to FIGS. 8 to 10.

Figure 8:
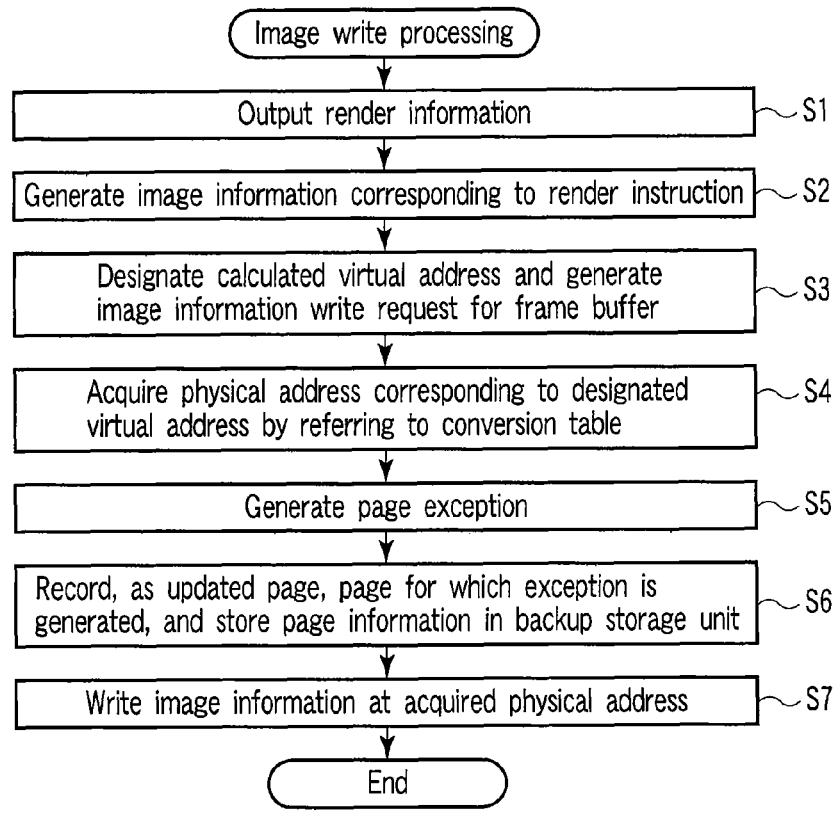
FIG. 8 is a flowchart for explaining image write processing performed by the virtual computer server apparatus.

As shown in FIG. 8, in image write processing in the virtual computer server apparatus 100, first of all, the application unit 11 outputs a render instruction to request rendering of a display image when, for example, image information associated with the processing executed by the application is updated (step S1).

The renderer 112 then performs image processing in accordance with the render instruction, and generates image information as a result of the processing (step S2). The image information contains start coordinate information and end coordinate information corresponding to the area to be updated. Subsequently, the an address calculation unit 113 calculates a virtual address on the basis of the coordinate information of a pixel to be updated. The graphic library 111 designates the calculated virtual address, and generates a request to write image information in the frame buffer 202 (step S3).

The acquisition unit 212 acquires a physical address corresponding to the designated virtual address by referring to the conversion table stored in the table storage unit 211 (step S4). If the write bit of a page for which a write request is generated is disabled when the conversion table is referred to, the exception generating unit 215 generates a page exception (step S5). Upon detecting the page exception, the storage unit 301 stores, in the backup storage unit 302, image information before a write in the page for which the page exception has been generated (a write has been performed). The detection unit 303 detects and records the page for which the page exception has been generated as an update page (step S6). In addition, the writing unit 214 writes the requested image information in the frame buffer 202 at the physical address acquired by the acquisition unit 212, and terminates the image write processing (step S7). Note that an exception can be generated in the page for which the page exception has been generated, when subsequent image information is written. For this reason, at this point in time, the write bit for this page is enabled. Detection of an update image in a display area and transmission of an update image are performed for a display terminal at a constant period. After an update image is transmitted, the write bit for the page is disabled.

Figure 9:
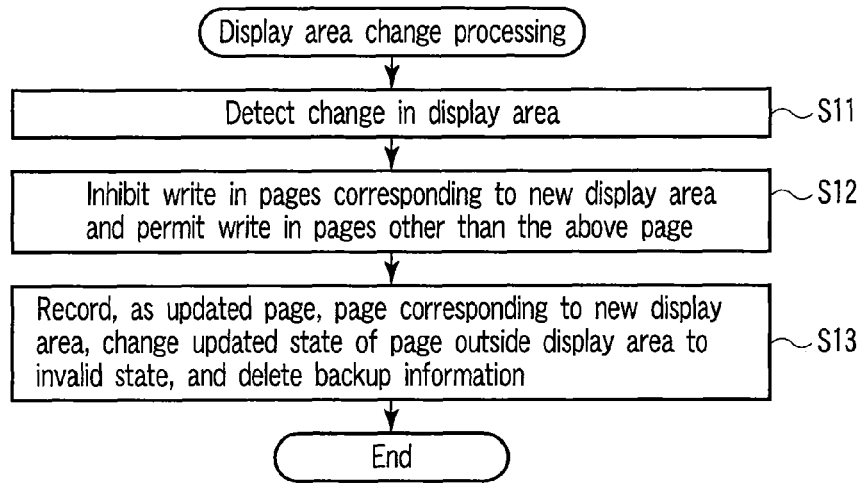
FIG. 9 is a flowchart for explaining display area change processing performed by the virtual computer server apparatus.

FIG. 9 shows display area change processing in the virtual computer server apparatus 100. If a display area is determined immediately after the virtual computer server apparatus 100 and the display terminal TE start session connection or input information associated with the movement of a scroll bar is received from the display terminal TE, the virtual display control unit 502 of the virtual input/output interface unit 53 detects a change in the display area (step S1). Area information to be displayed on the display terminal TE is obtained by, for example, a method of replacing area information at the time of session connection initialization or calculating a new display area on the basis of the movement amount (the number of pixels corresponding to movement) of a scroll bar. Here, each page belonging to the display area is called a displayed page, and each page belonging to the non-display area is called a non-displayed page.

The virtual display control unit 502 then sets the write bit for each page belonging to a new display area to a disabled state (e.g., "0"), and the write bit for each page belonging to a new non-display area to an enabled state (e.g., "1") in the exception generating unit 215 of the virtual display unit 12 via the exception mask instruction unit 509 (step S12). Obviously, it suffices to use negative logic instead of positive logic. As a result, when render processing is executed for the display area, the exception generating unit 215 generates a page exception.

The virtual display control unit 502 also causes the detection unit 303 of the back-end virtual display unit 13, via the updated state changing instruction unit 508, to delete the update detection history of pages corresponding to the non-display area and record pages corresponding to the entire new display area as update pages. In addition, the virtual display control unit 502 deletes all the image information stored in the backup storage unit 302 of the back-end virtual display unit 13 via the updated state changing instruction unit 508, and terminates the display area change processing (step S13).

Figure 10:
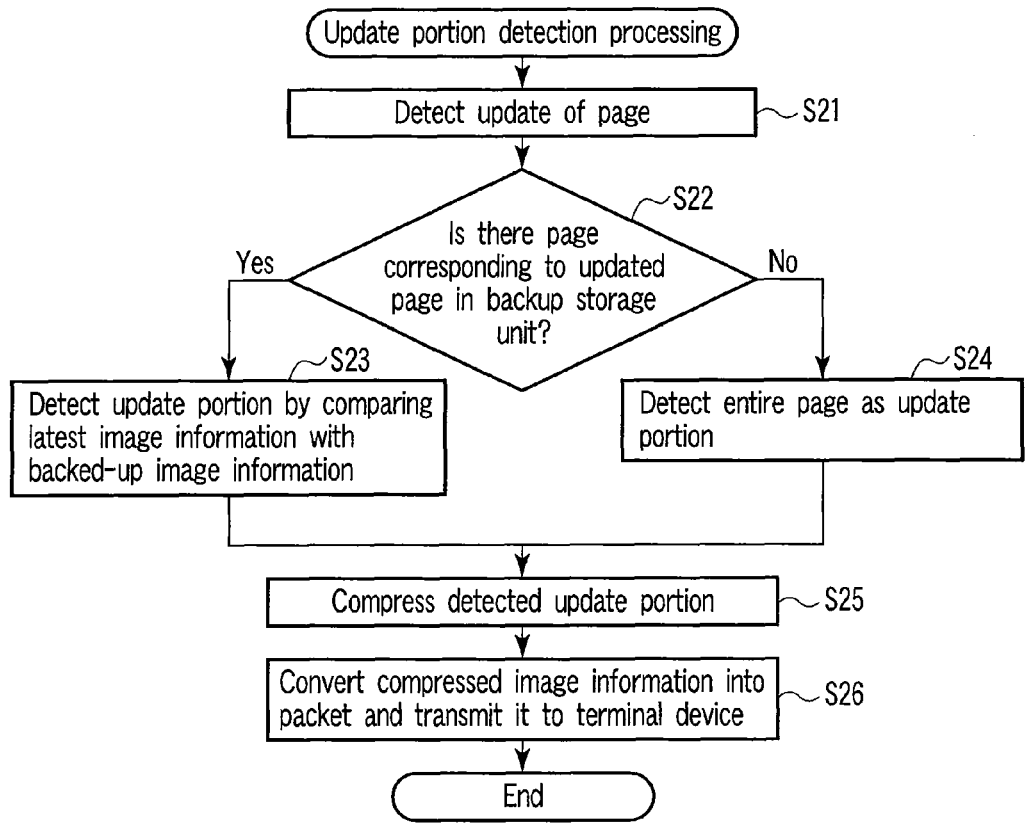
FIG. 10 is a flowchart for explaining update image detection processing performed by the virtual computer server apparatus.

The update image detection processing shown in FIG. 10 is started by, for example, a periodic interrupt from the timer.

The detection unit 303 of the back-end virtual display unit 13 detects an update page from a record at the time of generation of a page exception or at the time of a change in the display area (step S21).

The detection unit 303 then compares the latest image information written in the frame buffer 202 with the image information stored in the backup storage unit 302 with regard to a detected update page, and detects a difference portion as an update image (steps S22 and S23). At this time, if there is no image information corresponding to the page detected as an update page in the backup storage unit 302 (step S22), since no difference between pages can be taken, the entire area of the one page is detected as an update image (step S24). This case occurs when update image detection processing is performed first after the display area is changed.

The transmission image generating unit 501 of the virtual input/output interface unit 53 generates a transmission image from the update image detected by the detection unit 303 of the back-end virtual display unit 13 and a supplementary image such as a scroll bar, and performs compression processing (step S25). The transmission unit 505 then converts the compressed image information into a packet and transmits it to the display terminal, thus terminating the update image detection processing (step S26). Thereafter, the write bit of the page is set to a disable state again in the display area.

Image write processing and update image detection processing will be described in more detail with reference to FIGS. 11 to 13.

Figure 11:
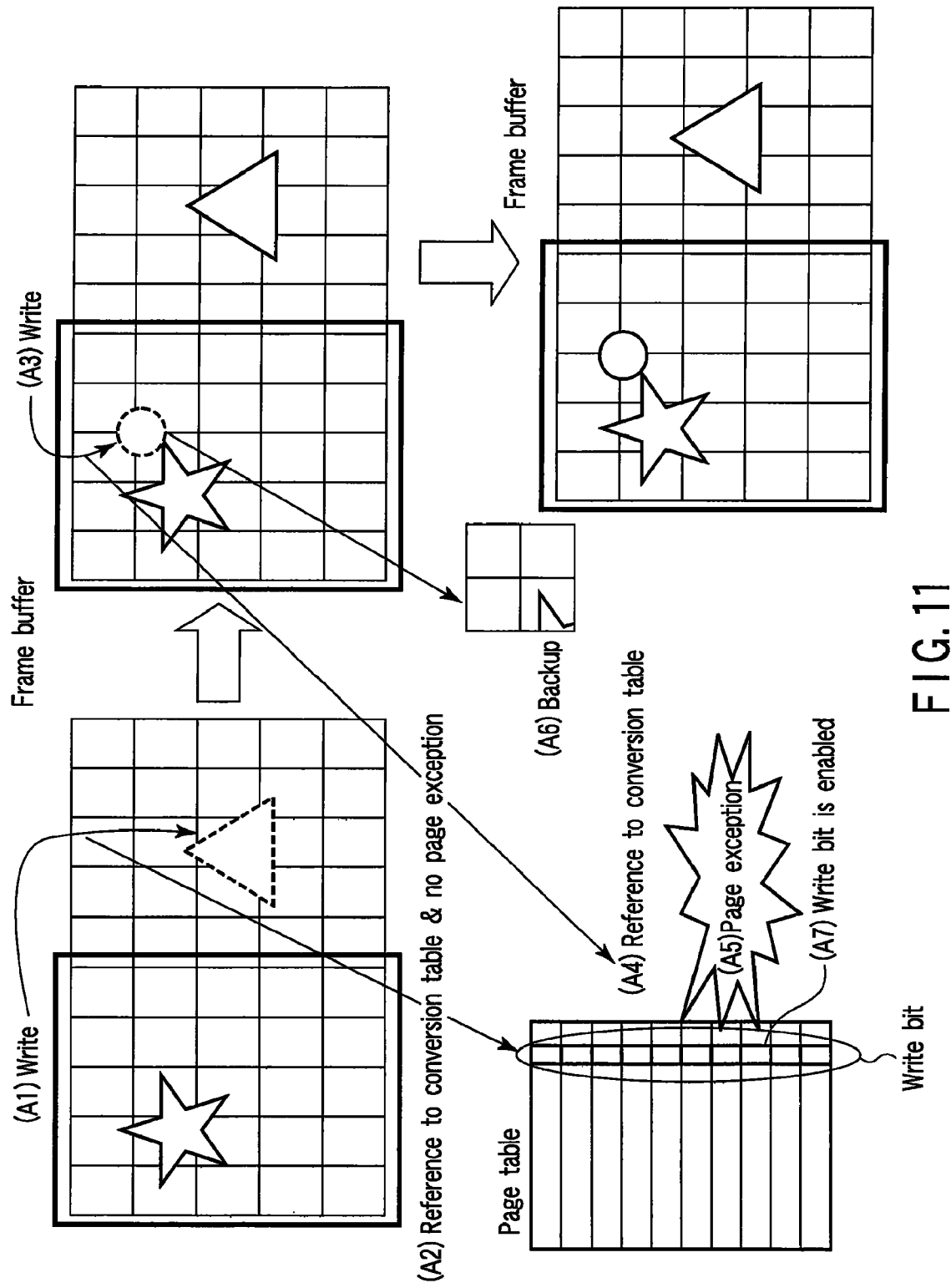
FIG. 11 is a view for explaining the image write processing in FIG. 8.
Figure 12:
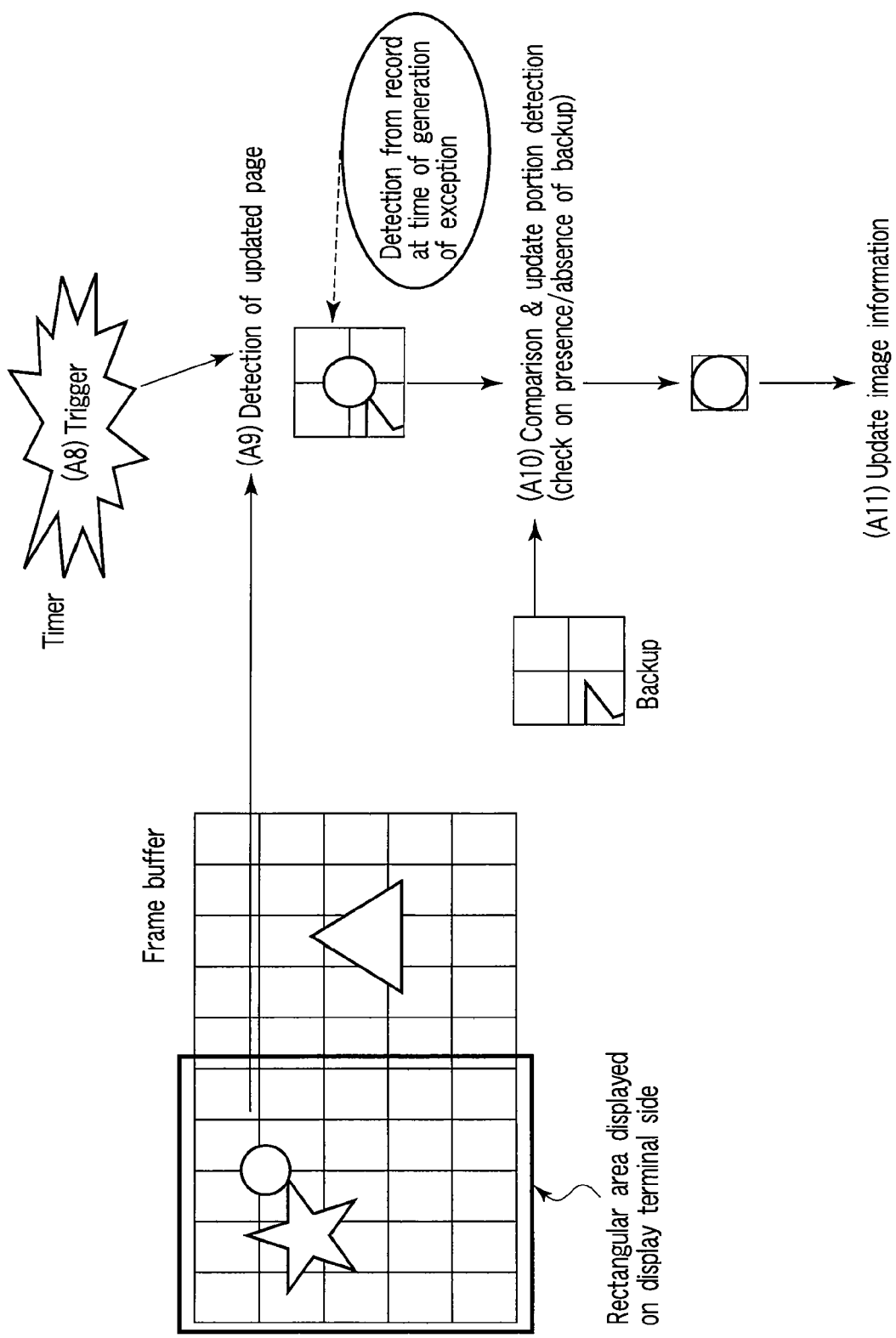
FIG. 12 is a view for explaining update image detection processing in FIG. 10.
Figure 13:
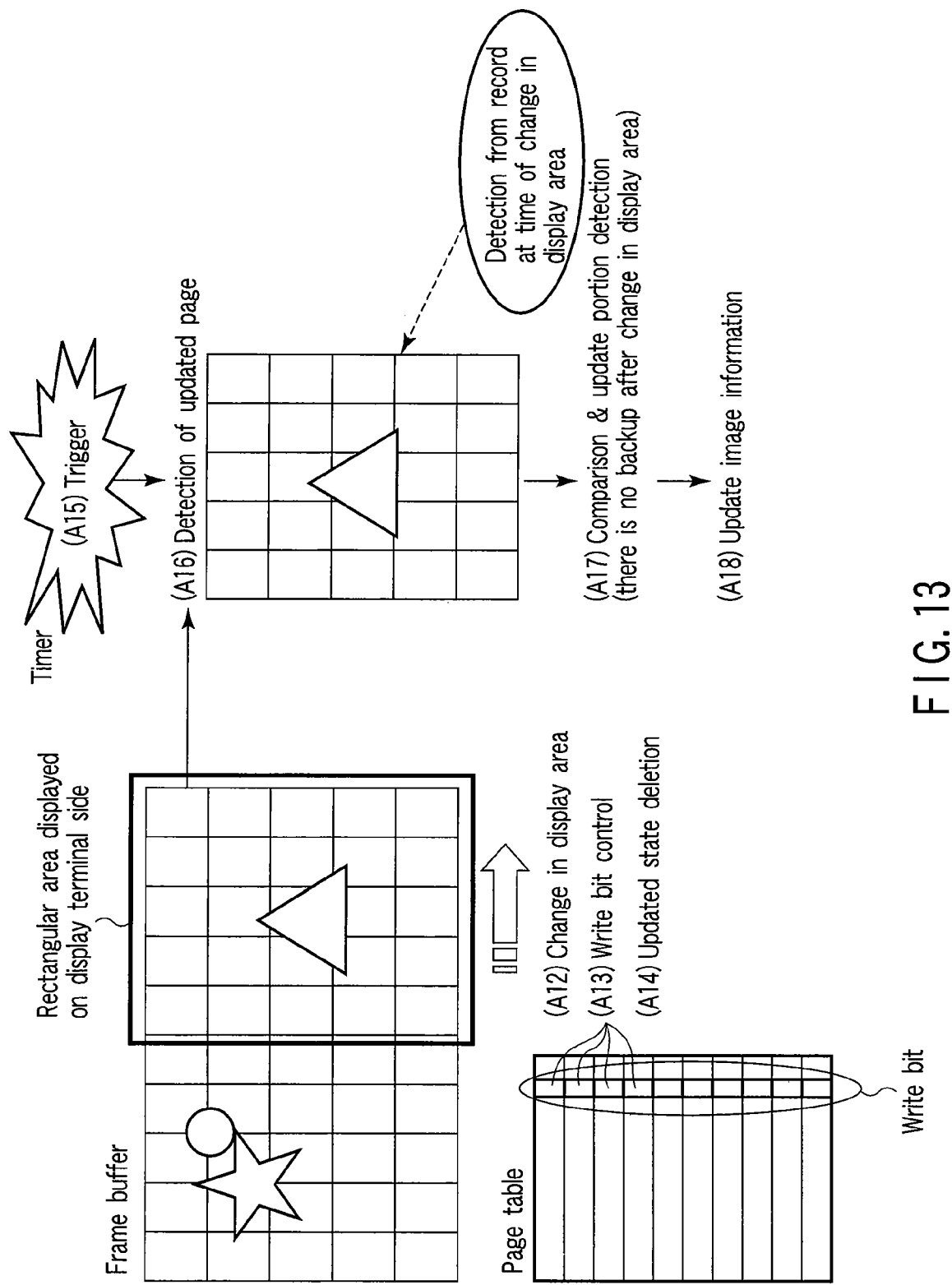
FIG. 13 is a view for explaining update image detection processing to be performed when a display area is changed after the transmission of an update image.

Assume that in the case shown in FIGS. 11, 12, and 13, the an address calculation unit 113 of the graphic library 111 divides the screen image displayed on the display terminal TE into 32×32 pixel rectangular areas, and calculates virtual addresses in the frame buffer such that the virtual addresses of one page (4,096 bytes) correspond to the respective pixels in each divided rectangular area. More specifically, the an address calculation unit 113 converts coordinate information (X, Y) into an address (addr) in the frame buffer according to equation (2) instead of equation (1) conventionally used. "OFFSET" represents the value of an offset up to the start address at which storage of image information starts. With regard to the following equations, different optimization schemes are used for actual calculation expressions, depending on the operation state of the display or the computing ability of the address calculation unit 113.

$$\text{addr} = \text{OFFSET} + (X<<2) + (Y<<12) \quad (1)$$

$$\text{addr} = \text{OFFSET} + ((X\&0\text{x}1f)<<10) \times 3 + ((X\&0\text{x}1f)<<2) + (Y<<7) \quad (2)$$

Referring to FIG. 11, the rectangular area enclosed by the solid line represents the display area displayed on the display terminal TE. The other rectangular area therefore represents the non-display area which is not displayed on the display terminal.

In the image write processing, first of all, the virtual display control unit 502 of the virtual input/output interface unit 53 acquires display area information and disables the write (writable) bit of each page belonging to the display area. With this operation, when the graphic library 111 writes information in the frame buffer for the display area, a page exception associated with the corresponding page is generated.

In (A1) in FIG. 11, the application unit 11 sends a render instruction to the frame buffer via the graphic library 111 to display an image (step S1 in FIG. 8). In (A2), the memory management unit 201 converts the virtual address designated by the render instruction from the graphic library 111 into a physical address (steps S2 to S4 in FIG. 8) by referring to the conversion table. Note that in (A1), a write operation is performed on the non-display area of the display terminal TE. With regard to the non-display area, since the write (writable) bits in the page table are enabled in advance, no page exception is generated at this point in time.

In (A3), the application unit 11 executes a render instruction for the frame buffer 202 again (step S1 in FIG. 8). In this case, a write is performed in a display area on the display terminal TE. In (A4), when the memory management unit 201 refers to the conversion table, the write (writable) bits in the page table associated with the display area are disabled in advance. In (A5), therefore, the exception generating unit 215 generates a page exception (steps S2 to step S5 in FIG. 8). In (A6), in accordance with the generated page exception, the storage unit 301 of the back-end virtual display unit 13 detects the corresponding page in the frame buffer for which the graphic library 111 has generated an update request, and stores the backup of the contents of the page in the backup storage unit 302. The detection unit 303 also records the page as an update page (step S6 in FIG. 8). The writing unit 214 writes requested image information at the physical address acquired by the acquisition unit 212 in the frame buffer 202. In (A7), the changing unit 213 of the memory management unit 201 changes the write (writable) bits in the page table for the page to an enabled state.

Although the graphic library 111 continues an image write thereafter, an image is subsequently written in the corresponding page without generating any page exception.

With regard to an image write in another page, since a page exception is generated, (A5), (A6), and (A7) described above are sequentially executed.

In this manner, it is possible to form pages suitable for a rectangular area on a screen image, generate a page exception only at the time of the first write operation to only a page for which image write request has been generated, and leave a backup of image information before the image write.

As shown in FIG. 12, the detection unit 303 of the back-end virtual display unit 13 executes update image detection processing for image information by, for example, a periodic interrupt from the timer. Update image detection processing is the processing of comparing the backed-up image information of a page recorded as an update page with the image information of the current page, and extracting a rectangle in which a difference exists within the page. For example, the timer is set to generate interrupts at 1/60-sec intervals when a frame on the display terminal TE is updated 60 times per sec.

In (A8) in FIG. 12, update image detection processing is started in response to a trigger by the timer. Subsequently, in (A9), the detection unit 303 detects an update page on the basis of the information recorded in (A6) (step S21 in FIG. 10). In (A10), the detection unit 303 further detects, for each update page, a rectangle as an update image by comparing the image information before update, which is backed up in the backup storage unit 302, with the latest image information after the update, which is written in the frame buffer 202 (steps S22 and S23). Note that, as shown in FIG. 12, the detection unit 303 detects the minimum rectangular area including the updated area as an update image from a plurality of adjacent pages.

In (A11), the transmission image generating unit 501 of the virtual input/output interface unit 53 compresses the detected update image (step S25 in FIG. 10). The transmission unit 505 transmits the compressed update image information to the display terminal TE (step S26 in FIG. 10). Although not shown in FIG. 12, after the compressed update image information is transmitted to the display terminal TE, the image information corresponding to the transmission image which is backed up in the backup storage unit 302 is discarded, and the update page history corresponding to the transmission image which is recorded in the detection unit 303 is also deleted. With regard to the memory area in the frame buffer 202, all the write bits in the page table corresponding to the display area are disabled again.

FIG. 13 is a view for explaining update image detection processing to be performed when a display area is changed after an update image is transmitted in (A11) in FIG. 12. In display area change processing, as shown in FIG. 9, upon detecting the movement of a scroll bar or the like on the basis of input information from the display terminal TE, the virtual display control unit 502 calculates a rectangular area as a new display area after the change and a rectangular area as a new non-display area after the change, and stores information associated with the display area in the display area storage unit 503.

In (A12) in FIG. 13, when the virtual display control unit 502 detects a change in the display area on the basis of input information from the display terminal TE (step S11 in FIG. 9), the virtual display control unit 502 updates the display area storage unit 503 which stores the new display area and non-display area. Referring to FIG. 13, for example, if the frame area (frame buffer) managed by a guest OS is defined by 1024×768 pixels, the rectangle information (0, 0, 512, 768) of the display area before the change is updated into rectangle information (512, 0, 512, 768) of the display area after the change.

In (A13), the virtual display control unit 502 enables the write bits in the page table associated with the non-display area for the exception generating unit 215 of the virtual display unit 12 via the exception mask instruction unit 509, and disables the write bits in the page table associated with the new display area (step S12 in FIG. 9). That is, when rendering is executed for a page corresponding to the new display area, the exception generating unit 215 generates a page exception.

Subsequently, in (A14), the virtual display control unit 502 deletes image information associated with the non-display area from the backup storage unit 302 and also deletes all the update page history in the detection unit 303 via the updated state changing instruction unit 508. In addition, the virtual display control unit 502 records all the pages belonging to the new display area as update pages (step S13 in FIG. 9).

In (A15), the update image detection processing in FIG. 10 is started in response to a trigger by the timer.

In (A16), the detection unit 303 detects an update page from a past record (step S21 in FIG. 10). In the first embodiment, an update page is detected by using a record at the time of detection of a change in a display area in addition to a record at the time of generation of a page exception. In the case shown in FIG. 13, when a timer interrupt occurs after the display area changes, the entire new display area is detected as update pages.

In (A17), the image information backed up in the backup storage unit 302 is compared with the latest image information written in the frame buffer 202 for each update page, and a rectangle as an update image is detected. In the first embodiment, since the backup information of a rectangular area as a non-display area is not stored, the difference between them cannot be acquired. For this reason, all the update pages are detected as update images (steps S22 and S24 in FIG. 10).

In (A18), a transmission image is generated on the basis of the image information of the detected update image (the entire new display area), and is transmitted to the display terminal TE (steps S25 and S26 in FIG. 10).

Note that FIGS. 11, 12, and 13 show a case in which addresses in a page are calculated in accordance with a rectangular image. Obviously, however, an address calculation can be executed by a general calculation method. The first embodiment has exemplified the case in which the capacity of the frame buffer of the display terminal TE corresponds to the maximum resolution. That is, every time the virtual computer server apparatus 100 on the display image transmission side detects a change in a display area, the apparatus transmits the entire new display area as an update image. This allows the display terminal TE on the reception side to comprise only a frame buffer corresponding to the capacity of one frame. That is, if, for example, the resolution of the display terminal is 1024×768 pixels and color information comprises four bytes per pixel, the display terminal may comprise only a frame buffer having a memory capacity of 1024×768×4 bytes regardless of the number of guest OSs of the virtual computer server apparatus 100 connected via the network and the resolutions of the guest OSs.

As described above, according to the first embodiment, if image information includes a display area to be displayed on the display terminal TE connected via the network and a non-display area not to be displayed on the terminal, the virtual computer server apparatus 100 detects only an update image, of the image information, which corresponds to the display area. This makes it possible to efficiently (with a small processing amount) detect/transmit an update image for updating the image displayed on the terminal device.

[Second Embodiment]

The second embodiment can efficiently update an image by checking the execution/non-execution of update for a new display area when the display area is changed. The first embodiment detects an entire new display area as an update area, and transmits the corresponding information to a display terminal. The second embodiment transmits only a portion which has actually been updated. Therefore, the display terminal has a frame buffer for storing the entire contents of the frame buffer of the guest OS which the display terminal itself uses.

Referring to FIG. 1, if, for example, the capacity of the frame area (frame buffer) managed by guest OS 1 is 1024×768×4 bytes (number of horizontal pixels×number of vertical pixels×number of bytes per pixel) and the capacity of the frame area managed by guest OS 2 is 1024×768×4 bytes, a display terminal TE1 connected via a network includes two virtual frame buffers (each having a memory capacity of 1024×768×4 bytes) associated with each guest OS.

If guest OS 3 manages an image area corresponding to a memory capacity of 1600×1200×4 bytes, a display terminal TE2 includes a virtual frame buffer corresponding to the same memory capacity, i.e., 1600×1200×4 bytes, regardless of the capacity of the frame buffer series-connected to the output of a display device 606.

Note that a frame buffer 602 ensures a capacity in accordance with the output resolution of the display device 606 as in the first embodiment described above. That is, if the output resolution of a display terminal is 1024×768 pixels and each pixel comprises four bytes, the display terminal includes a frame buffer having a capacity of 1024×768×4 bytes. The display terminal executes output (render) processing by writing image information in the frame buffer.

As shown in FIG. 14, the display terminal TE according to the second embodiment includes a plurality of virtual frame buffers 608.

In the second embodiment, even if an image area from a guest OS exceeds the maximum output resolution of the display device 606 of the display terminal TE or images from a plurality of guest OSs are to be simultaneously displayed, the display terminal includes a plurality of virtual frame buffers 608 equal in capacity to a plurality of frame buffers 202 which a plurality of guest OSs in use respectively include, as shown in FIG. 14. This is because, since the server apparatus detects only an area which has actually changed upon occurrence of a change in a display area, and transmits the corresponding information to a display terminal so as to allow more efficient image detection than in the first embodiment, it is necessary for the display terminal to include a storage area corresponding to the frame buffer of each guest OS.

For example, in the case shown in FIGS. 1 and 3, if a screen image area from guest OS 3 is 1600×1200 pixels, the display terminal TE needs to include a virtual frame buffer 608 corresponding to 1600×1200 pixels. Immediately after the start of session connection or after a change in the display area, the display terminal TE and a virtual computer server apparatus 100 negotiate for information associated with the display area. This allows a frame generating unit 603 in the display terminal TE to acquire only image information matching the display area from the virtual frame buffers 608 and render the information in the frame buffer 602, thereby implementing display processing. The display terminal TE and the virtual computer server apparatus 100 negotiate for information associated with the display area (corresponding guest OS information and the rectangle information of the display area) via a network immediately after the start of session connection or after a change in the display area.

Information associated with a display area is preferably stored in a session information storage unit 604. Note that when the virtual computer server apparatus 100 generates scroll bar display information and transmits the image information, the display terminal TE also prepares a virtual frame buffer for storing the image information of the scroll bar.

In the second embodiment, although the memory capacity to be ensured in the display terminal TE increases, the virtual computer server apparatus 100 on the image information transmission side can execute update frame detection processing more efficiently than in the first embodiment. That is, in the first embodiment, when a screen image area has changed, the virtual computer server apparatus 100 detects the entire new display area as an update image and transmits the image information. In contrast, in the second embodiment, even after the range of a display area changes, the virtual computer server apparatus 100 detects only a rectangular area in which the update has occurred, and transmits the update image information. That is, even if a non-display area becomes a display area as the range of the display area changes, the update area is efficiently detected.

In the first embodiment, as shown in FIG. 9, when a change in the display area is detected, the entire new display area is recorded as an update image. In contrast, the virtual computer server apparatus 100 according to the second embodiment detects only the update page by checking the bit value of the conversion table which is to be changed at the time of page update when the display area changes.

Referring to FIG. 15, as in the case shown in FIG. 9, after the write bits of pages are controlled (steps S31 and S32), the update bits of pages belonging to a new display area after a change in the area are checked. If an update bit is "1" ("0" in the case of negative logic) indicating the execution of a data write, the corresponding page is detected and recorded as an update page (step S33).

An overall processing sequence for detecting an update page by using an update bit in step S33 will be described below. After a graphic library 111 of the virtual computer server apparatus 100 performs render instruction processing, address calculation processing, and physical address acquisition processing, a changing unit 213 changes the access bit and update bit of the conversion table to "1". The access bit "1" indicates that the page has been accessed. Note that in the image write processing (see FIG. 8) in the first embodiment, a description of change processing for an access bit and an update bit is omitted. In practice, however, similar bit change processing is executed.

A writing unit 214 then writes the requested image information at the physical address acquired by an acquisition unit 212, and terminates the image write processing. When a display area has changed, in the second embodiment, a virtual display control unit 502 instructs a detection unit 303 to check an update bit for the detection of an update page via an update scan instruction unit 510.

The detection unit 303 according to the second embodiment has a means for detecting and recording a page whose access bit and update bit are "1" ("0" in the case of negative logic) as an update page in addition to a means for recording a page for which an exception has occurred as a page in which image information has been updated, on the basis of exception information from an exception generating unit 215.

Image write processing and update image detection processing according to the second embodiment will be described next more concretely with reference to FIGS. 16 to 18.

Figure 16:
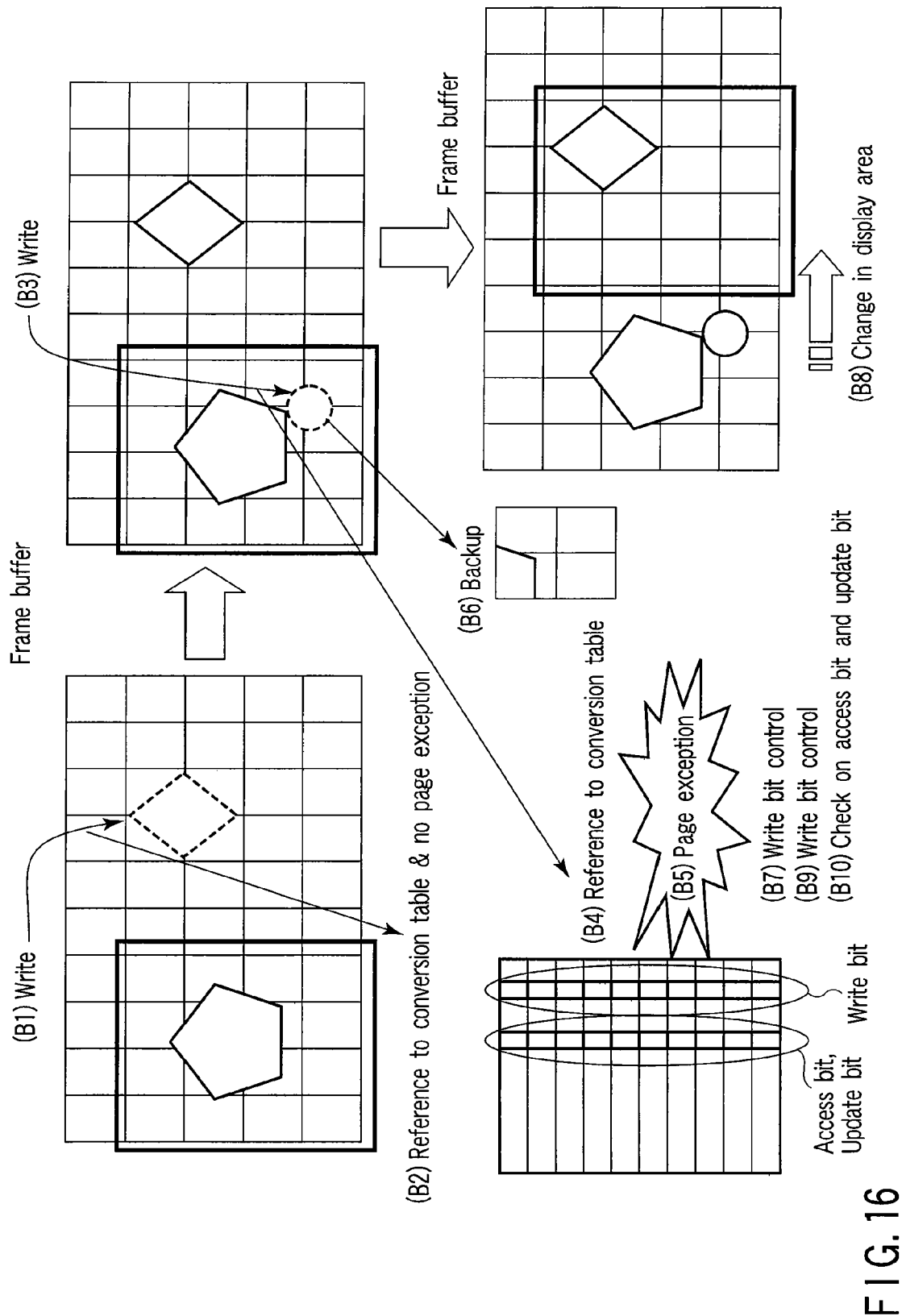
FIG. 16 is a view for explaining image write processing according to the second embodiment.

In the image write processing, first of all, in (B1) in FIG. 16, an application unit 11 sends a render instruction for a frame buffer via the graphic library 111 to display a frame. In (B2), a memory management unit 201 converts the virtual address designated by the render instruction from the graphic library 111 into a physical address by referring to the conversion table. When information is rendered in a non-display area like that described in (B1), although no page exception is generated, a changing unit 213 changes the access bit of the entry in a page directory corresponding to the upper 10 bits of the virtual address to "1". With regard to the page table indicated by the entry, the changing unit 213 further changes the access bit and update bit of the entry corresponding to the middle 10 bits of the virtual address to "1" ("0" in the case of negative logic).

The values of an access bit and update bit are changed at the time of an image write in the same manner as in the first embodiment. After the access and update bits are changed, the graphic library 111 continues image write processing.

(B3) is a case in which a write is executed for a display area. As described in the first embodiment, in (B4), (B5), (B6), and (B7), an update page accompanying the occurrence of a page exception, backup of image information, and write bit change control are executed.

(B8) indicates how a display area is changed. In this case, in (B9), write bit change processing is performed for only the display area so as to generate a page exception.

In (B10), an access bit and an update bit are checked for a new display area. It is determined whether there is a page for which write processing is executed (i.e., an update page whose access bit and update bit are "1" ("0" in the case of negative logic)), during an interval in which the new display area is a non-display area.

In the update image detection processing, first of all, in (B11) in FIG. 17, the detection unit 303 executes update image detection processing for image information by, for example, a periodic interrupt from a timer. In (B12), the detection unit 303 compares the update page history information recorded in step S33 in FIG. 15 with page information associated with the display area at this point in time, and detects an update page. Referring to FIG. 17, an access bit and an update bit are checked at the time of a change in a display area to detect, as an update page, a page, of a page group belonging to the display area at this point in time, in which the access bit and update bit are "1" ("0" in the case of negative logic).

In (B13), the detection unit 303 acquires image information corresponding to the detected update page from a backup storage unit 302, and compares the acquired image information with the latest image information stored in a frame buffer 202, thereby detecting a different portion as an update image. The area which is displayed at the time of the update detection processing in FIG. 17 is an area for which write processing has been executed during the period of the non-display area in FIG. 16, and has not undergone backup processing for an image accompanying the generation of a page exception. For this reason, the detection unit 303 detects the entire area of the update page as an update image.

In (B14), a transmission image is generated on the basis of the update image (image compression processing or the like is executed), and is transmitted to the display terminal TE. Although not shown in FIG. 17, after the compressed image information of the update image is transmitted to the display terminal TE, image information corresponding to the transmission image which is backed up in the backup storage unit 302 is discarded, and an update page history corresponding to the transmission image which is recorded in the detection unit 303 is also deleted. In addition, all the write bits in a page table corresponding to the display area in the memory area of the frame buffer 202 are disabled.

Figure 18:
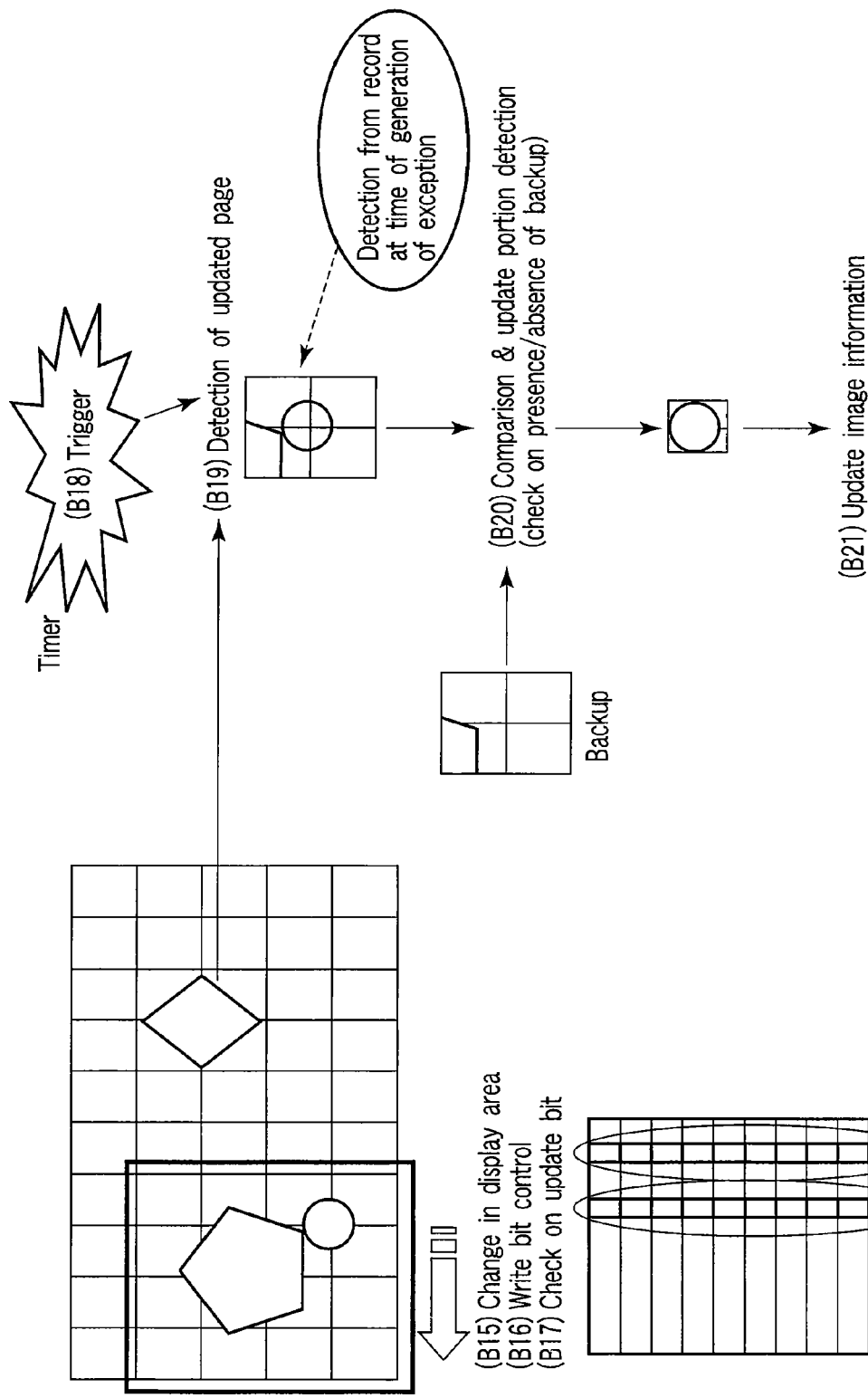
FIG. 18 is a view for explaining a processing operation to be performed when an area which is initially a display area in FIG. 16 temporarily becomes a non-display area, and then becomes a display area again.

In the case shown in FIG. 18, after an area which is initially a display area in FIG. 16 temporarily becomes a non-display area, the area becomes a display area again.

In (B15), (B16), and (B17), display area change processing is executed. In (B17), an update page is determined by checking an access bit and an update bit. However, since update page determination has already been performed by a page exception, the updated state is used without any changed.

In (B18), update image detection processing is started by a periodic interrupt from the timer. In (B19), the detection unit 303 acquires update page information from the history. The page detected as an update page at this point in time uses a record accompanying the determination of update at the time of generation of a page exception when this area was a display area in the past.

In (B20), image information corresponding to the detected update page is acquired from the backup storage unit 302 and compared with the latest image information to detect a different portion as an update image. In the case in FIG. 18, the update page has undergone backup processing at the time of generation of a page exception when the corresponding area was a display area in the past. Therefore, only a different portion is detected as an update image by calculating the difference between the backed-up image before update which is stored in the backup storage unit 302 and the image after update which is stored in the frame buffer 202.

In (B21), the virtual computer server apparatus 100 generates a transmission image by using the detected update image, and transmits the image to the display terminal TE. Referring to FIG. 18, although not shown as in the case shown in FIG. 17, after the compressed image information of an update portion is transmitted to the display terminal TE, image information corresponding to the transmission image backed up in the backup storage unit 302 is discarded, and an update page history corresponding to the transmission image which is recorded in the detection unit 303 is also deleted. In addition, all the write bits in the page table corresponding to a display area are disabled in the memory area of the frame buffer 202.

The second embodiment needs to prepare a relatively large memory area on the display terminal TE side. However, as compared with the first embodiment, since the area detected as an update page on the virtual computer server apparatus 100 side is small, the load required for transmission image generation processing, the amount of image information transmitted on a network, and display frame generation processing (image decompression processing) on the display terminal TE is small, and more efficient update detection can be executed.

Note that a method of causing the display terminal TE to determine information associated with a new display area upon occurrence of a change in the display area can be a method of causing the virtual computer server apparatus 100 to independently notify, to the display terminal TE, information (rectangle information) associated with a display area, a method of executing change determination for a display area by the display terminal TE on the basis of the rectangle information of the update image information received from the virtual computer server apparatus 100, or the like. It suffices to use any of these methods.

As described above, according to the second embodiment, if image information includes a display area to be displayed on the display terminal TE connected via the network and a non-display area not to be displayed on the terminal, the virtual computer server apparatus 100 detects an update image from only the display area of the image information. This makes it possible to efficiently (with a small processing amount) detect/transmit an update image for updating the image displayed on the terminal device.

[Third Embodiment]

In the first and second embodiments, an update page is detected and image information is backed up by using a page exception. In contrast to this, a virtual computer server apparatus 100 according to the third embodiment detects an update page in a display area by referring to the bit values in a conversion table which are changed at the time of updating a page.

Image write processing and update image detection processing in the third embodiment will be described with reference to FIGS. 19 an 20.

Figure 19:
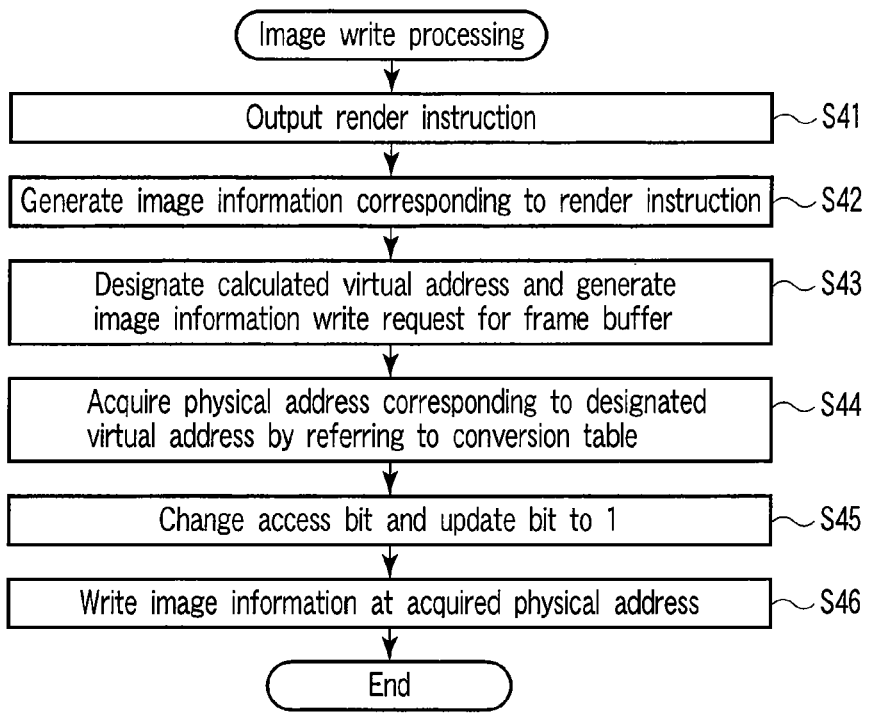
FIG. 19 is a flowchart for explaining image write processing according to the third embodiment.

In the image write processing shown in FIG. 19, the render processing, address calculation processing, and physical address acquisition processing in steps S41 to S44 are the same as those in the virtual computer server apparatuses 100 according to the first and second embodiments (steps S1 to S4 in FIG. 8). Therefore, a description of such processing will be omitted.

In step S44, after an acquisition unit 212 acquires a physical address, a changing unit 213 changes the access bit and update bit in the conversion table to "1" ("0" in the case of negative logic) (step S45). Subsequently, a writing unit 214 writes the requested image information at the physical address acquired by the acquisition unit 212 in the frame buffer 202 (step S46), and terminates the image write processing.

As described above, unlike the first and second embodiments, in the image write processing, the third embodiment omits the processing of generating a page exception and storing the backup of a page upon recording the page for which the page exception has been generated as an update page. Therefore, all the write bits in the page table are enabled.

Figure 20:
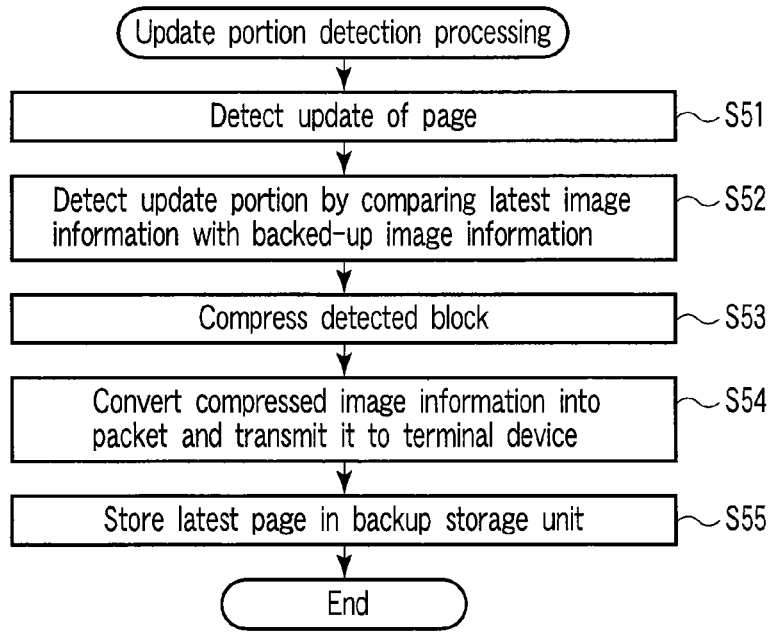
FIG. 20 is a flowchart for explaining update image detection processing according the third embodiment.

In the update image detection processing shown in FIG. 20, a detection unit 303 detects, as an update page, a page whose access bit and update bit are "1" ("0" in the case of negative logic) from a display area (step S51).

Subsequently, the detection unit 303 acquires image information corresponding to the detected update page from a backup storage unit 302, and compares the acquired image information with the latest image information stored in a frame buffer 202, thereby detecting a different portion as an update image (step S52).

As in the first and second embodiments, a compressed image is generated and transferred (steps S53 and S54). A storage unit 301 then stores the latest image information written in the frame buffer 202 in the backup storage unit 302 (step S55), and terminates the detection processing.

A display terminal TE according to the third embodiment has the same arrangement as that shown in FIG. 7. Upon detecting a change in a display area, the virtual computer server apparatus 100 detects an entire new display area as an update page, and transmits the image information to the display terminal TE. That is, when a change in a display area is detected, a virtual display control unit 502 instructs the detection unit 303 of a back-end virtual display unit 13 via an updated state changing instruction unit 508 to detect an update page. Upon receiving this instruction, the detection unit 303 detects and records all the pages belonging to the new display area as update pages. In addition, the updated states of pages belonging to the non-display area are deleted.

Unlike the first and second embodiments, when a change in a display area is detected, no control is performed on the write bits in the page table. In addition, the virtual display control unit 502 deletes backup information corresponding to a non-display area from the backup storage unit 302 via the updated state changing instruction unit 508. Note that after the compressed image information of an update portion is transmitted to the display terminal TE, an update page history corresponding to the transmission image which is recorded in the detection unit 303 is deleted.

As described above, according to the third embodiment, if image information includes a display area to be displayed on the display terminal TE connected via the network and a non-display area not to be displayed on the terminal, the virtual computer server apparatus 100 detects an update image from only the display area of the image information. This makes it possible to efficiently (with a small processing amount) detect/transmit an update image for updating the image displayed on the terminal device.

[Fourth Embodiment]

The fourth embodiment is configured to detect an update page in a display area by referring to the bit values in a conversion table which are changed when a page is updated. Assume that in the fourth embodiment, a display terminal TE includes a plurality of virtual frame buffers 608 for storing the contents of the frame buffers of (a plurality of) guest OSs, as shown in FIG. 14. Image write processing and update detection processing in the fourth embodiment are the same as those described in the third embodiment with reference to FIGS. 19 and 20.

When a change in the range of a display area is detected, the fourth embodiment executes the processing of checking a conversion table corresponding to the new display area and detecting and storing, as an update page, a page whose access bit and update bit are both "1" ("0" in the case of negative logic). In the fourth embodiment, in general, since check processing (check processing for the conversion table) for the access bits and update bits in a conversion table and backup processing are performed for a display area for each timer interrupt, it is not always necessary to additionally perform the detection processing upon detection of a change in a display area.

Note that when a virtual display control unit 502 detects a change in a display area, it suffices to immediately execute conversion table check processing. Obviously, in update image detection processing (FIG. 10) accompanying the first timer interrupt after a change in an area, it is possible to execute check processing for a conversion table corresponding to the display area at an arbitrary timing within the range up to the start time of update page detection processing. This also applies to the second embodiment.

In the fourth embodiment, it is necessary to prepare a relatively large memory area on the display terminal TE side. As compared with the third embodiment, however, an area detected as an update page on the virtual computer server apparatus 100 side becomes small when the display area is changed. This reduces the load required for transmission image generation processing, the amount of image information transmitted on a network, and display image generation processing (image decompression processing) on the display terminal. This can execute update detection more efficiently.

Note that a method of causing the display terminal TE to determine information associated with a new display area upon occurrence of a change in the display area can be a method of causing the virtual computer server apparatus 100 to independently notify information (rectangle information) associated with a display area, a method of executing change determination for a display area by the display terminal TE on the basis of the rectangle information of the update image information received from the virtual computer server apparatus 100, or the like. It suffices to use any of these methods.

As described above, according to the fourth embodiment, if image information includes a display area to be displayed on the display terminal TE connected via the network and a non-display area not to be displayed on the terminal, the virtual computer server apparatus 100 performs update detection for only a display area of the image information, and transmits the update image to a terminal device. This makes it possible to efficiently (with a small processing amount) detect/transmit an update image to be transmitted to the terminal device.

The techniques of the present invention described in the embodiments of the invention (especially the respective components of the virtual computer server apparatus 100 shown in FIGS. 4 to 6) can be stored and distributed as programs which can cause a computer to execute them, in a recording medium such as a magnetic disk (a flexible disk, hard disk, or the like), an optical disk (a CD-ROM, DVD, or the like), or a semiconductor memory.

What is claimed is:

1. A virtual computer server apparatus which transmits image information generated by operating an application program to a terminal via a network comprising:
   an image information memory to store the image information upon dividing into pages, the page being a memory of a predetermined size;
   an update unit configured to update the image information stored in the image information memory in accordance with operation of the application program;
   an update page detection unit configured to detect an update page from the pages storing image information transmitted to the terminal and displayed by the terminal as a display area, the update page being an page which includes the image information updated by update unit;
   an update image detection unit configured to detect the image information updated by the update unit from image information in the update page before updated and image information in the update page after updated;
   a transmission image generating unit configured to generate transmission image information from the image information updated detected by the update image detection unit;
   a transmission unit configured to transmit the transmission image information to the terminal; and
   a backup memory to store the image information of the page before updated, wherein the update image detection unit (a) detects the image information updated by the update unit, the image information being a difference between the image information of the update page before updated and the image information of the update page after updated, when the image information of the update page before updated is stored in the backup memory, and (b) detects the image information of the update page after updated by update unit, when the image information of the update page before updated is not stored in the backup memory.

2. The apparatus according to claim 1, further comprising:
   a table memory to store first control information for each page stored image information being displayed as the display area, and to store second control information for each page stored non-display area which is other than the displayed pages, and
   a generating unit configured to generate a page exception interrupt when the page which stored the first control information is updated by the update unit, and wherein
   the update page detection unit detects the update page, the update page being the page for which the page exception interrupt is generated.

3. The apparatus according to claim 2, further comprising:
   an area changing unit configured to change the display area to a new display area; and wherein
   the update page detection unit detects the update page, the update page being page which stores image information displayed as the new display area.

4. The apparatus according to claim 3, further comprising:
   a first changing unit configured to rewrite the first control information stored in the table memory into the second control information for each page which is changed from the display area into the non-display area, and to rewrite the second control information stored in the table memory into the first control information for each page which is changed from the non-display area to the display area, when the area changing unit change the display area.

5. The apparatus according to claim 2, wherein the table memory further stores determination information indicating, for each page, whether the page is updated by the updating unit.

6. The apparatus according to claim 5, further comprising:
   an area changing unit configured to change the display area to a new display area;
   a first changing unit configured to rewrite the first control information stored in the table memory into the second control information for each page which is changed from the display area into the non-display area, and to rewrite the second control information stored in the table memory into the first control information for each page which is changed from the non-display area to the display area, when the area changing unit change the display area; and
   a second changing unit configured to change, for each page updated by the update unit, the determination information into the determination information indicating that the page is updated, and wherein
   the update page detection unit detects the update page from pages which stores image information displayed as the new display area, the update page being a page whose determination information indicates update.

7. The apparatus according to claim 1, which further comprising:
   a table memory to store, for each page, determination information indicating whether the page is updated by the update unit, and
   a first changing unit configured to change, for each page updated by the update unit, the determination information into the determination information indicating that the page is updated, and wherein
   the update page detection unit detects the update page from pages which stores image information displayed as the display area, the update page being a page whose determination information indicates update.

8. The apparatus according to claim 7, further comprising:
   an area changing unit configured to change the display area to a new display area; and wherein
   the update page detection unit detects the update page, the update page being page which stores image information displayed as the new display area.

9. The apparatus according to claim 7, further comprising:
   an area changing unit configured to change the display area to a new display area; and wherein
   the update page detection unit detects the update page from pages which stores image information being displayed as the new display area, the update page being a page whose determination information indicates update.

10. An update image detection method for use in a server apparatus which transmits image information generated by operating an application program to a display device via a network, the server apparatus comprising
   (a) an image information memory to store the image information upon dividing into pages, the page being a memory of a predetermined size,
   (b) an update unit configured to update the image information stored in the image information memory in accordance with operation of the application program, and
   (c) a table memory;
   the method including:
   storing, in the table memory, first control information for each page stored image information being transmitted to the display device and displayed by the display device as a display area;
   storing, in the table memory, second control information for each page stored non-display area which is other than the displayed pages;
   generating a page exception interrupt when the page which stored the first control information is updated by the update unit;
   detecting a update page, the update page being the page for which the page exception interrupt is generated;
   detecting the image information updated by the update unit from image information in the update page before updated and image information in the update page after updated;
   changing the display area to a new display area; and
   detecting the update page, the update page being page which stores image information displayed as the new display area.

11. The method according to claim 10, further including:
   rewriting, when the display area is changed, the first control information stored in the table memory into the second control information for each page which is changed from the display area into the non-display area;
   rewriting, when the display area is changed, the second control information stored in the table memory into the first control information for each page which is changed from the non-display area to the display area.

12. The method according to claim 10, further including:
   storing, in the table memory, determination information indicating, for each page, whether the page is updated by the updating unit.

13. The method according to claim 12, further including:
   changing the display area to a new display area;
   rewriting, when the display area is changed, the first control information stored in the table memory into the second control information for each page which is changed from the display area into the non-display area;
   rewriting, when the display area is changed, the second control information stored in the table memory into the first control information for each page which is changed from the non-display area to the display area;
   changing, for each page updated by the update unit, the determination information into the determination information indicating that the page is updated; and
   detecting the update page from pages which stores image information displayed as the new display area, the update page being a page whose determination information indicates update.

14. An update image detection method for use in a server apparatus which transmits image information generated by operating an application program to a display device via a network, the server apparatus comprising
   (a) an image information memory to store the image information upon dividing into pages, the page being a memory of a predetermined size,
   (b) an update unit configured to update the image information stored in the image information memory in accordance with operation of the application program, and
   (c) a table memory to store determination information indicating, for each page, whether the page is updated by the updating unit;
   the method including:
   changing, for each page updated by the update unit, the determination information into the determination information indicating that the page is updated;
   detecting an update page from the pages storing image information transmitted to the terminal and displayed by the terminal as a display area, the update page being an page which includes an image updated by the update unit;
   detecting the image information updated by the update unit from image information in the update page before updated and image information item in the update page after updated;
   changing the display area to a new display area; and
   detecting the update page, the update page being page which stores image information displayed as the new display area.

15. An update image detection method for use in a server apparatus which transmits image information generated by operating an application program to a display device via a network, the server apparatus comprising
   (a) an image information memory to store the image information upon dividing into pages, the page being a memory of a predetermined size,
   (b) an update unit configured to update the image information stored in the image information memory in accordance with operation of the application program, and
   (c) a table memory to store determination information indicating, for each page, whether the page is updated by the updating unit;
   the method including:
   changing, for each page updated by the update unit, the determination information into the determination information indicating that the page is updated;
   detecting an update page from the pages storing image information transmitted to the terminal and displayed by the terminal as a display area, the update page being an page which includes an image updated by the update unit;
   detecting the image information updated by the update unit from image information in the update page before updated and image information item in the update page after updated;
   changing the display area to a new display area; and
   detecting the update page from pages which stores image information being displayed as the new display area, the update page being a page whose determination information indicates update.

16. An update image detection method for use in a server apparatus which transmits image information generated by operating an application program to a display device via a network, the server apparatus comprising
   (a) an image information memory to store the image information upon dividing into pages, the page being a memory of a predetermined size, (b) an update unit configured to update the image information stored in the image information memory in accordance with operation of the application program, and
(c) a table memory;
the method including:
storing, in the table memory, first control information for each page stored image information being transmitted to the display device and displayed by the display device as a display area;
storing, in the table memory, second control information for each page stored non-display area which is other than the displayed pages;
generating a page exception interrupt when the page which stored the first control information is updated by the update unit;
detecting a update page, the update page being the page for which the page exception interrupt is generated;
detecting the image information updated by the update unit from image information in the update page before updated and image information in the update page after updated,
wherein detecting the image information updated by update unit (a) detects, the image information being a difference between the image information of the update page before updated and the image information of the update page after updated, when the image information of the update page before updated is stored in a backup memory, and (b) detects, as the updated image, the image information of the update page after updated by update unit, when the image information of the update page before updated is not stored in the backup memory.

17. An update image detection method for use in a server apparatus which transmits image information generated by operating an application program to a display device via a network, the server apparatus comprising
(a) an image information memory to store the image information upon dividing into pages, the page being a memory of a predetermined size,
(b) an update unit configured to update the image information stored in the image information memory in accordance with operation of the application program, and
(c) a table memory to store determination information indicating, for each page, whether the page is updated by the updating unit;
the method including:
changing, for each page updated by the update unit, the determination information into the determination information indicating that the page is updated;
detecting an update page from the pages storing image information transmitted to the terminal and displayed by the terminal as a display area, the update page being an page which includes an image updated by the update unit;
detecting the image information updated by the update unit from image information in the update page before updated and image information item in the update page after updated,
wherein detecting the image information updated by update unit (a) detects, the image information being a difference between the image information of the update page before updated and the image information of the update page after updated, when the image information of the update page before updated is stored in a backup memory, and (b) detects, as the updated image, the image information of the update page after updated by update unit, when the image information of the update page before updated is not stored in the backup memory.

18. An update image detection method for use in a virtual computer server apparatus which transmits image information generated by operating an application program to a terminal via a network, the method comprising:
storing in an image information memory the image information upon dividing into pages, the page being a memory of a predetermined size;
updating, by an update unit, the image information stored in the image information memory in accordance with operation of the application program;
detecting, by an update page detection unit, an update page from the pages storing image information transmitted to the terminal and displayed by the terminal as a display area, the update page being an page which includes the image information updated by update unit;
detecting, by an update image detection unit, the image information updated by the update unit from image information in the update page before updated and image information in the update page after updated;
generating, by a transmission image generating unit, transmission image information from the image information updated detected by the update image detection unit;
transmitting, by a transmission unit, the transmission image information to the terminal; and
storing in a backup memory the image information of the page before updated, wherein the update image detection unit (a) detects the image information updated by the update unit, the image information being a difference between the image information of the update page before updated and the image information of the update page after updated, when the image information of the update page before updated is stored in the backup memory, and (b) detects the image information of the update page after updated by update unit, when the image information of the update page before updated is not stored in the backup memory.

19. The method according to claim 18, further comprising:
storing in a table memory first control information for each page stored image information being displayed as the display area, and storing in the table memory second control information for each page stored non-display area which is other than the displayed pages, and
generating, by a generating unit, a page exception interrupt when the page which stored the first control information is updated by the update unit, and wherein
the update page detection unit detects the update page, the update page being the page for which the page exception interrupt is generated.

20. The method according to claim 19, further comprising:
changing, by an area changing unit, the display area to a new display area; and wherein
the update page detection unit detects the update page, the update page being page which stores image information displayed as the new display area.

21. The method according to claim 20, further comprising:
rewriting, by a first changing unit, the first control information stored in the table memory into the second control information for each page which is changed from the display area into the non-display area, and rewriting, by the first changing unit, the second control information stored in the table memory into the first control information for each page which is changed from the non-display area to the display area, when the area changing unit change the display area.

22. The method according to claim 19, wherein the table memory further stores determination information indicating, for each page, whether the page is updated by the updating unit.

23. The method according to claim 22, further comprising:
- changing, by an area changing unit, the display area to a new display area;
- rewriting, by a first changing unit, the first control information stored in the table memory into the second control information for each page which is changed from the display area into the non-display area, and rewrite, by the first changing unit, the second control information stored in the table memory into the first control information for each page which is changed from the non-display area to the display area, when the area changing unit change the display area; and
- changing, by a second changing unit, for each page updated by the update unit, the determination information into the determination information indicating that the page is updated, and wherein
- the update page detection unit detects the update page from pages which stores image information displayed as the new display area, the update page being a page whose determination information indicates update.

24. The method according to claim 18, which further comprising:
- storing in a table memory, for each page, determination information indicating whether the page is updated by the update unit, and
- changing, by a first changing unit, for each page updated by the update unit, the determination information into the determination information indicating that the page is updated, and wherein
- the update page detection unit detects the update page from pages which stores image information displayed as the display area, the update page being a page whose determination information indicates update.

25. The method according to claim 24, further comprising:
- changing, by an area changing unit, the display area to a new display area; and wherein
- the update page detection unit detects the update page, the update page being page which stores image information displayed as the new display area.

26. The method according to claim 24, further comprising:
- changing, by an area changing unit, the display area to a new display area; and wherein
- the update page detection unit detects the update page from pages which stores image information being displayed as the new display area, the update page being a page whose determination information indicates update.

* * * * *